United States Patent [19]

Marshall

[11] Patent Number: 5,774,878
[45] Date of Patent: Jun. 30, 1998

[54] VIRTUAL REALITY GENERATOR FOR USE WITH FINANCIAL INFORMATION

[76] Inventor: Paul Steven Marshall, 25 Fifth Ave., Apt. 6F, New York, N.Y. 10003

[21] Appl. No.: 267,108

[22] Filed: Jun. 27, 1994

Related U.S. Application Data

[63] Continuation of Ser. No. 954,775, Sep. 30, 1992.

[51] Int. Cl.[6] ........................... G06F 17/00; G06F 17/50
[52] U.S. Cl. ............................... 705/35; 705/1; 705/10; 705/35; 705/36
[58] Field of Search ................................... 364/401, 408; 705/1, 10, 35, 36

[56] References Cited

U.S. PATENT DOCUMENTS

| | | |
|---|---|---|
| 3,829,838 | 8/1974 | Lewis et al. . |
| 4,934,773 | 6/1990 | Becker . |
| 4,952,922 | 8/1990 | Griffin et al. . |
| 5,021,976 | 6/1991 | Wexelblat et al. . |
| 5,041,992 | 8/1991 | Cunningham et al. . |
| 5,109,475 | 4/1992 | Kosaka et al. . |
| 5,130,794 | 7/1992 | Ritchey . |

FOREIGN PATENT DOCUMENTS

| | | |
|---|---|---|
| 0 435 601 A2 | of 0000 | European Pat. Off. . |
| 0 447 095 A3 | of 0000 | European Pat. Off. . |

OTHER PUBLICATIONS

"Countdown to the Cyber Market ", by John Greeenwood, *The Financial Post Magazine,*Mar. 1994, pp.28–32.

"Visible Decisions, Information You Can See ", *Visible Decisions Inc.,* Toronto, Canada, believed to be published Jun. 1993.

"Pay For the Internet and Your Phone Bill, Too ", by Laura Evenson, Mar. 9, 1994, San Francisco Chronicle.

"Terrain of Events (The First Virtual Reality Trading Systems, Allowing Data to be Explored like the Terrain of the Real World, are Available and Helping Users Make Money, Clive Davidson Enters the Tenth Dimension) ", Apr. 1994, *Risk Magazine* .

"Getting to the Bigger Picture, " Eric Garland, *Marketing Computers* , Dec. 1993, pp.4–5.

"VR Art Show at the Guggenheim ", by Sara Hedberg, *Virtual Reality Special Report * Premier Issue* 1994, pp. 73–75.

"Virtual Reality: Immurse Yourself "by Carrie R. Smith, *Wall Street & Technology,* vol. 14, No. 7, pp. 10–14, Dec. 1993.

"Lost in Cyberspace", *The Observer Life* , Nov. 14, 1993, pp.4–5.

"Virtual Reality, How Technology Can Amplify The Human Mind ", *Business Week* Oct. 5, 1992, p.96.

"New Virtual Reality, Three–Dimensional Software Will Track Stock Market Trade in Real Time ", by Julie Craig, *Data Broadcasting Corporation,* –News Release, believed to be dated Aug. 1993.

"Visible Decisions—Information You Can See ", *Reveal, The Information Animation Newsletter,* Jul. 1994.

"Information–Age Warriors ", by Gen. Colin L. Powell, *Byte,* Jul. 1992, p.370.

(List continued on next page.)

*Primary Examiner*—Emanuel T. Voeltz
*Assistant Examiner*—Phillip Groutt
*Attorney, Agent, or Firm*—Kenyon & Kenyon

[57] ABSTRACT

A virtual reality generator having an input module that receives as input financial information is disclosed. The virtual reality generator outputs to a display device a virtual reality world generated from the financial information. The financial information can be preprocessed by a financial analytic system prior to input to the virtual reality generator. The financial information can be received from a data file. The virtual reality generator can dynamically display and continuously update the virtual reality world. Further, movement through the virtual reality world can be simulated.

42 Claims, 16 Drawing Sheets

OTHER PUBLICATIONS

"Seventeen New York Organizations Nominated for 1994 Computerworld Smithsonian Awards", Press Release—The Computerworld Smithsonian Awards, Cambridge, MA, Mar. 23, 1994.

H. Reingold, Virtual Reality, 1991, pp. 154–174,367–371.

"Coming Soon: Data You Can Look Under and Walk Through", by A. Pollack, *New York Times,* Oct. 14,1990, p.F9.

IBM Corporation, IBM AIX Visualization Date Explorer/6000, Visualize the Future . . . Today, Jul.1991.

Precision Visuals, Inc., Visual Data Analysis Software, Comand Language, 1992.

"Visualizing n–Dimensional Virtual Worlds With n–Vision", by Feiner, S. and Beshers, C., published in *Computer Graphics,* Vol. 24 No. 2, pp. 37–38, Mar. 1990.

World Tool Kit, developed by Sense 8 Corp, 1990.

"Fundamentals of Interactive Computer Graphics", by J.D. Foley and A. Van Dam, Adison Wesley Publishing Company, 1984, pp. 6 and 539.

"Virtual Reality on the Trading Desk", *Wall Street & Technology,* pp. 14–18. vol. 9. No. 6, Feb. 1992.

"Cyberspace Meets Wall Street", pp. 164–168, *Forbes,* Jun. 22, 1992.

"The Information Visualizer, an Information Workspace",pp. 181–188, Reaching Through Technology, ACM's Chicago 1991 Conference Proceedings.

"The Illustrated Science and Invention Encyclopedia "pp. 2372–2373, Copyright 1983, H.S. Stuttman, Inc.

"PV–Wave Point & Click ", brochure, Precision Visuals, Inc. 1991.

"PV–Wave For Financial Applications", brochue Precison Visuals, Inc., 1991.

"PV–Wave Command Language", brochure,Precision Visuals, Inc., 1991.

"Worlds within Worlds —Metaphors for Exploring n–Dimensional Virtual Worlds", pp. 76–83, Proceedings of ACM Symposium on User Interface Software and Technology, Snowbird, Utah, Oct. 3–5, 1990.

"Pilot's Operatig Handbook and Airplane Flight Manual for Flight SImulator II", Copyright 1986, SubLOGIC Corporation, p.19.

Rohrbough, Linda; "Cyberarts; Lanier of VP; on voomies; & VR's future"; Newsbytes; Nov. 18, 1991.

Jacobson, Linda; "Virtual Reality: a status report",Al Expert; Aug. 1991 v6, n8,p26.

Hindus, Len; "Virtual reality offers growing oppurtunity – for risk takers", EDN Vol v35, n 10A, p51, May 3, 1990.

Saffro, Paul; "Virtual reality is almost real.", Personal Computer; v14, n6,p99; Jun. 19,1990.

PV–Wave Point & Click Visual Data Analysis Software; Precision Visuals, Inc; 1991.

PV–Wave For Financial Applications; Precision Visuals, Inc.

PV–Wave; Command Language; Precision Visuals Inc.

FUND.PRI

| | ISSUE | TYPE | DIVIDEND | BOOK | EARNINGS | EARNINGS EST | SEDOL | HOLDINGS | MARKET CAP | NAME | INDUSTRY GROUP |
|---|---|---|---|---|---|---|---|---|---|---|---|
| 170 — | .DJI | I | | 0 | 0 | 0 | 0 | 0 | 0 | 1 DJ-INDUSTRIAL | 1001-DJ_INDEX |
| | .DJT | I | | 0 | 0 | 0 | 0 | 0 | 0 | 1 DJ-TRANSPORT | 1001-DJ_INDEX |
| | .DJU | I | | 0 | 0 | 0 | 0 | 0 | 0 | 1 DJ-UTILITY | 1001-DJ_INDEX |
| | .SPO | I | | 0 | 0 | 0 | 0 | 0 | 0 | 1 S&P-100-INDEX | 1004-SP_INDEX |
| | .SPC | I | | 0 | 0 | 0 | 0 | 0 | 0 | 1 S&P-500-INDEX | 1004-SP_INDEX |
| | .SPT | I | | 0 | 0 | 0 | 0 | 0 | 0 | 1 S&P-TRANS-IND | 1004-SP_INDEX |
| | .SPU | I | | 0 | 0 | 0 | 0 | 0 | 0 | 1 S&P-UTIL-INDE | 1004-SP_INDEX |
| | .SPF | I | | 0 | 0 | 0 | 0 | 0 | 0 | 1 S&P-FINAN-IND | 1004-SP_INDEX |
| | .IPCI | I | | 0 | 0 | 0 | 0 | 0 | 0 | 1 :CRUDE-OIL-IN | 1009-CRUDE_OIL |
| | .IPSI | I | | 0 | 0 | 0 | 0 | 0 | 0 | 1 :DUBAI-CRUDE- | 1009-CRUDE_OIL |
| | .GDAX | I | | 0 | 0 | 0 | 0 | 0 | 0 | 1 :DEUTSCHE-AK | 1010-DAX_INDEX |
| | .FAZI | I | | 0 | 0 | 0 | 0 | 0 | 0 | 1 :FAZ-SHARE-IN | 1011-FAZ_INDEX |
| | .GREX | I | | 0 | 0 | 0 | 0 | 0 | 0 | 1 :REX-RENTEN-I | 1012-GREX_INDEX |
| | .GREX | I | | 0 | 0 | 0 | 0 | 0 | 0 | 1 1:REX-RENTEN- | 1012-GREX_INDEX |
| | .GREX | I | | 0 | 0 | 0 | 0 | 0 | 0 | 1 5:REX-RENTEN- | 1012-GREX_INDEX |
| | .GREX | I | | 0 | 0 | 0 | 0 | 0 | 0 | 1 10:REX-RENT.- | 1012-GREX_INDEX |
| | .FCHI | I | | 0 | 0 | 0 | 0 | 0 | 0 | 1 :CAC-FORTY-IN | 1013-CAC_INDEX |
| | .FCGI | I | | 0 | 0 | 0 | 0 | 0 | 0 | 1 :CAC-GENERAL- | 1013-CAC_INDEX |
| | FDXJ/JUN92 | F | | 0 | 0 | 0 | 0 | 0 | 0 | 1 DAX-IN | 1014-DAX_INDEX_FUTURE |
| | FDXU2/SEP92 | F | | 0 | 0 | 0 | 0 | 0 | 0 | 1 DAX-IN | 1014-DAX_INDEX_FUTURE |
| | FDXZ2/DEC92 | F | | 0 | 0 | 0 | 0 | 0 | 0 | 1 DAX-IN | 1014-DAX_INDEX_FUTURE |
| | FDXH3/MAR93 | F | | 0 | 0 | 0 | 0 | 0 | 0 | 1 DAX-IN | 1014-DAX_INDEX_FUTURE |
| | 7004 | S | | 5 | 200 | 30 | 50 | 0 | 0 | 1 :HITACHI-SHIPB | 1201-AUTOS |
| 172 — | 7267 | S | | 10 | 800 | 70 | 82 | 0 | 0 | 1 :HONDA-MOTOR | 1201-AUTOS |

FIG. 5a 122191.pri

| ISSUE | TYPE | LAST/BID | HIGH | LOW | VOLUME | CHG |
|---|---|---|---|---|---|---|
| .TSE | I | 3434.010 | 3442.430 | 3430.230 | 0 | -0.5 |
| .TSE35 | I | 189.060 | 190.360 | 188.650 | 0 | -0.6 |
| .TSEF | I | 0.000 | 0.000 | 0.000 | 0 | |
| .TSMI | I | 0.000 | 0.000 | 0.000 | 0 | |
| 001.HK | S | 25.100 | 25.300 | 24.800 | 631600 | 0.0 |
| 002.HK | S | 32.750 | 33.250 | 32.250 | 2732679 | -1.5 |
| 003.HK | S | 13.400 | 13.500 | 13.300 | 1333000 | 0.0 |
| 004.HK | S | 16.800 | 17.000 | 16.500 | 3894652 | 0.0 |
| 005.HK | S | 54.500 | 55.000 | 52.000 | 4828985 | 3.8 |
| 006.HK | S | 18.700 | 19.000 | 18.600 | 1697496 | 0.0 |
| 007.HK | S | 14.400 | 14.500 | 14.000 | 6449600 | -0.7 |
| 008.HK | S | 8.900 | 8.950 | 8.800 | 1433139 | 0.6 |
| 009.HK | S | 2.250 | 2.300 | 2.300 | 107000 | -4.3 |
| 010.HK | S | 11.200 | 11.300 | 11.100 | 3733000 | 0.0 |
| 011.HK | S | 53.000 | 53.500 | 51.500 | 1930922 | 1.9 |
| 012.HK | S | 18.700 | 18.800 | 18.600 | 1977000 | 0.0 |
| 013.HK | S | 17.100 | 17.300 | 16.800 | 3859811 | 0.6 |
| 014.HK | S | 13.500 | 13.600 | 13.400 | 854000 | 0.0 |
| 015.HK | S | 60.000 | 60.500 | 59.500 | 1367803 | 0.0 |
| 016.HK | S | 32.000 | 32.750 | 32.000 | 6580760 | -1.5 |
| 017.HK | S | 17.300 | 17.400 | 17.000 | 5597000 | 0.0 |
| 018.HK | S | 1.590 | 1.600 | 1.580 | 2162000 | 0.6 |
| 019.HK | S | 34.500 | 34.750 | 34.000 | 3526700 | -0.7 |
| 020.HK | S | 8.100 | 8.250 | 8.050 | 2325600 | -1.2 |
| 023.HK | S | 38.000 | 38.250 | 37.500 | 3060527 | 0.0 |

| Issue | MktPr S/E | SPIN.PRI FV Profit | Delta %Profit | Gamma %Ann P | Theta EqualRa | ImplVol Gamma-ER | ImplDe | Last | UnderPr | Parity |
|---|---|---|---|---|---|---|---|---|---|---|
| Premium | | | | | | | | | | |
| KRNG_t.F/MAR0294/680 C -64.32 | 1.4 | 1319.4 | 1 | 0 | -53.327 | 0 | 0 | 1.4 | 1910 | 1230 |
| ZANG_t.F/DEC0198/188 C -2.6 | 2.81 | 1318 | 94145 | 7927.3 | 4.84 | 8E+10 | 0 | 33.1 | 227 | 39 |
| DAIG800U/SEP/800 P 23.45 | 33.1 | 119.24 | 0.959 | 0.0008 | -9.3443 | 0 | 0 | 17.5 | 662.2 | -137.8 |
| | 1.21 | 86.14 | 260.25 | 22.5 | 2 | 54.27 | | | | |
| KFHG_tb./SEP0198/474 C 19.13 | 17.5 | 137.8 | -0.998 | 0 | 60.251 | 0 | 0 | 130 | 507 | 33 |
| ALVG236U/SEP/2368 P 36.84 | 0.83 | 120.3 | 687.43 | 6272.8 | 1.79 | -3E+06 | | | | |
| | 130 | 227.27 | 0.956 | 0.0005 | -23.909 | 0 | 0 | 101.9 | 1805 | -563 |
| THYH260X/DEC/260 P 30.78 | 1.07 | 97.27 | 74.82 | 9.65 | 1.25 | 31.09 | | | | |
| | 101.9 | 563 | -0.999 | 5E-06 | 199.83 | 0 | 0 | 15.3 | 210.5 | -49.5 |
| ALVG2200/MAR/2200 P 24.93 | 0.76 | 461.1 | 452.5 | 4129.1 | 1.16 | -573.51 | | | | |
| | 15.3 | 49.5 | -0.978 | 0.0029 | 21.709 | 0 | 0 | 55 | 1805 | -395 |
| ALVG227U/SEP/2273 P 28.38 | 0.81 | 34.2 | 223.53 | 622.81 | 1.14 | -12.69 | | | | |
| | 55 | 395 | -0.778 | 0.001 | 77.256 | 0 | 0 | 44.2 | 1805 | -468 |
| BVMG_t.F/JUN3093/363 C -5.36 | 0.82 | 340 | 618.18 | 1016.4 | 1.1 | -2.28 | | | | |
| | 44.2 | 468 | -0.998 | 3E-05 | 188.91 | 0 | 0 | 33 | 401 | 76 |
| 176 – SIEG_tb./JUN1398/610 C 17.33 | 0.79 | 423.8 | 958.82 | 8749.3 | 1.07 | -82.51 | | | | /178a |
| | 33 | 129.05 | 0.949 | 0.0012 | -79.658 | 0 | 0 | 124 | 625.6 | 15.6 |
| ALVG220X/DEC/2200 P 24.65 | 1.1 | 96.05 | 291.05 | 326.88 | 1.06 | 8.81 | | | | |
| | 124 | 205.1 | 0.807 | 0.0006 | -19.571 | 0 | 0 | 50 | 1805 | -395 |
| BHFG_tc./SEP3098/506 C 43.76 | 1.03 | 81.1 | 65.4 | 8.99 | 1.04 | 14.08 | | | | |
| | 50 | 395 | -0.885 | 0.0008 | 104.92 | 0 | 0 | 64.8 | 397 | -108.9 |
| THYH2400/MAR/240 P 17.77 | 0.82 | 345 | 690 | 1922.5 | 0.98 | -2.73 | | | | |
| | 64.8 | 101.96 | 0.884 | 0.0019 | -23.227 | 0 | 0 | 7.9 | 210.5 | -29.5 |
| GDAX180U/SEP/1800 P 12.92 | 0.78 | 37.16 | 57.35 | 7.66 | 0.98 | 10.68 | | | | |
| | 7.9 | 29.5 | -0.731 | 0.0138 | 10.094 | -1.67 | 0 | 17.5 | 1609.5 | -190.5 |
| VIAG_t.F/SEP0597/114 C 0.66 | 0.88 | 21.6 | 273.42 | 449.54 | 0.97 | 0 | | | | |
| | 17.5 | 177.32 | -0.995 | 0.0001 | 117.91 | -45.49 | 0 | 264.5 | 376 | 262 |
| DBKG750X/DEC/750 P 27.39 | 0.89 | 159.82 | 913.24 | 8333.3 | 0.91 | 0 | | | | |
| | 264.5 | 296.1 | 1 | 0 | -6.5087 | 2E+13 | 0 | 50 | 628 | -122 |
| THYH240U/SEP/240 P 16.39 | 3.3 | 31.6 | 11.95 | 2.25 | 0.87 | 0 | | | | |
| | 50 | 122 | -0.955 | 0.0015 | 45.164 | -6.15 | 0 | 5 | 210.5 | -29.5 |
| BAYG_tc./AUG2897/330 C 35.29 | 0.84 | 72 | 144 | 401.22 | 0.86 | 0 | | | | |
| | 5 | 29.5 | -0.994 | 0.0017 | 20.739 | -15.05 | 0 | 35.7 | 270.3 | -59.7 |
| | 0.88 | 24.5 | 490 | 4471.3 | 0.81 | 0 | | | | |
| | 35.7 | 57.103 | 0.819 | 0.0037 | -15.779 | 5.33 | | | | |
| | 0.82 | 21.4 | 59.95 | 9.74 | 0.8 | | | | | |

VIRTUAL REALITY GENERATOR FOR USE WITH FINANCIAL INFORMATION

This application is a continuation of application Ser. No. 07/954,775, filed on Sep. 30, 1992.

FIELD OF INVENTION

The present invention is directed to a virtual reality generator, and more particularly, a virtual reality generator for use with financial information.

BACKGROUND OF THE INVENTION

Virtual reality is a three dimensional computer-generated interface that allows users to see, move through and interact with information displayed as a three dimensional world. The three dimensional world is called a virtual reality world or Cyberspace. For example, a virtual reality world could be the inside of a building or a golf course. The virtual reality world is displayed using sophisticated output devices, such as high resolution color screens or a headset with a monitor in front of each eye to give the user the illusion that he or she is situated in the virtual reality world.

The virtual reality world can display real world objects. For example, a chair could be displayed in a virtual reality world, representing a chair in the real world and appearing to have all the physical properties of a real world chair. In such a virtual reality world, the user views and interacts with the display as if the user was in the real world.

The virtual reality world is usually generated using a high speed computer processor and specialized graphics hardware. The computer processor and graphics hardware can be controlled by a program, called a virtual reality generator, to create and continuously modify a virtual reality world and to simulate movement through the virtual reality world.

Virtual reality is regarded as having three features, namely immersion, navigation and interaction. Immersion is the use of sophisticated output devices to create the illusion of being inside the computer generated virtual reality world. For example, a head mounted display with a high resolution two dimensional color monitor in front of each eye can be used along with advanced three dimensional display techniques to create the illusion to the user that the user is inside the computer generated display. Alternatively, a high resolution color display, such as the NEC brand 20 inch monitor could be used "immerse" the user into the virtual reality world.

The second feature of virtual reality is tie ability of the user to navigate through the virtual reality world. For example, the virtual reality generator could create a computer module of a molecule or a city and enable the user to move through the molecule or city. The user can navigate through the virtual reality world using control devices, such as a trackball or spacebal, in electronic dataglove, a magnetic head position tracker, a keyboard, a joystick or a steering wheel. The use of a magnetic head position tracker and dataglove creates a high feeling of immersion and grants the user a great power of navigation (for example, by gestures) through a virtual reality environment.

The third feature of virtual reality, interaction, is the ability of the user to interact with and control the virtual reality world. For example, a user an specify the parameters that define and metaphors that comprise the virtual reality world. Navigation and interaction are closely related concepts.

Virtual reality environments can be created using object-oriented libraries of functions. These functions can be inserted into a computer program for rapid prototyping to easily complete application development. A well known example of an object-oriented library of functions is that created by the Sense8 Corporation of Sausalito, Calif, called the WorldToolKit library.

The WorldToolKit library is a library of C routines that lets a developer rapidly and easily build real-time three dimensional simulations and virtual world applications that run on desktop computers. The WorldToolKit library integrates a simulation manager, a real-time rendering pipeline, an object manager, texturing functions, animation sequences, input sensors, lights and graphics display devices in a flexible object-oriented library. The WorldToolKit library's texturing functions enable the development of applications with real-time texture mapping. Video-realistic textures can be applied to object surfaces in any orientation and scale, enabling the creation of compelling and lifelike virtual reality worlds. The WorldToolKit library has drivers for many popular control devices and output devices so that the user can configure input and output. Head-tracking, gesture tracking and object manipulation are accomplished by coupling sensors to graphical objects (or metaphors) and viewpoints. The WorldToolKit library is fully described in the WorldToolKit Reference Manual, 1991, published by the Sense8 Corporation, Sausalito, incorporated herein by reference.

Money managers and financial analysts must absorb large quantities of financial information and pick out trends in this information.

Money manager's and financial analysts often simultaneously view several computer screens watching data come in from a wide variety of sources in real-time and from other sources that are performing calculations on financial information. The money manager must determine movements in the market and other financial influences while making quick decisions. It is difficult, however, to view numerical data from many sources in real-time to notice overall trends and to consider the distinct underlying characteristics of each security in ones portfolio. Even if the information is displayed in graphical form on each computer screen, trends that concern all sources are difficult to spot. It is also difficult to visualize the behavior of all the dimensions underlying individual security elements.

Trading firms and investment houses use personal computers to create graphical maps and charts as metaphors of their portfolio holdings. Many of these do not use real-time data inputs. Advanced firms use decision-support systems that allow traders on the floor to monitor real-time incoming data using complex graphical models. Money managers and analysts use spreadsheets and graphs to understand financial information and trends. For example, a common system used for financial visualization is the WingZ graphical spreadsheet program. Another is the PV-Wave data analysis program. Such programs cannot display many different elements with unique characteristics at the same time or display embedded dimensions, interactive three-dimensional animations or multiple visual cues, especially cues that independent of each other.

Financial trading groups, for example stock and commodity brokers and foreign exchange traders, receive continuous streams of data via communications links information providers such as Reuters and Dow Jones. Spreadsheets and two and three dimensional graphs have been used to display segments of this data, but only a very limited segment of data is able to be displayed at any one time and the trader is unable to see trends across wide segments and dimensions of data. Further, graphical representation are more likely than tabular representations to show patterns and irregularities, because humans are much better at pattern and scene recognition than at number processing and comparison. However, a two dimensional or a three dimensional graph is limited in the amount of information that can be displayed and the amount of information a user can interact with.

Analytic programs now in use do not enable the user to view trends in large amounts of financial information in a superior graphical form while at the same time have the ability to view highly detailed data about specific items of this information. Current user interfaces and display techniques for large quantities of financial information are limited. A money manager is unable to "immerse" himself or herself into financial data representing many world markets and manipulate this data graphically. In particular, money managers and financial analysts currently can not use virtual reality techniques to analyze financial data.

It is known the art to use virtual reality model real world objects. For example, virtual reality has been used to create software applications that let architects "view" interiors of buildings and then enable a disabled person to "move" through the building to see if the design is satisfactory. Virtual reality has also been used to implement games that allow a user play-act within a virtual reality world, to enable a pilot to simulate flying an aircraft, to allow a surgeon to simulate a difficult operation and to allow a user to simulate visiting an art museum.

The use of virtual reality to allow a money manager or financial analyst (or other information professional) to view, manipulate, structure and travel through a three dimensional virtual reality world of financial information is not known. Nor is it known to use virtual reality techniques in combination with tools that carry out financial analysis, or to create artificial terrains where the boundaries of features of the terrain are related to the taxonomy of system that is being modelled.

SUMMARY OF THE INVENTION

The present invention uses virtual reality techniques to allow money managers and financial analysts to easily view otherwise unmanageable amounts of complex information and in particular, financial information about financial markets such as information about equities, commodities, currencies, derivatives and their related markets.

The virtual reality world created by the present invention does not map real world objects. Rather, the information displayed in virtual reality world created by the present invention is abstract information about the real world that does not have a physical object equivalent in the real world. The representative embodiment is directed to generating a virtual reality world from financial information, although in other embodiments, other abstract information, for example, sports results, legal information and defense information could be used to create the virtual reality world.

When abstract information, such as financial information, is displayed in a virtual reality world, it is represented by real world objects in three dimensional form, called metaphors. The present invention, in the representative embodiment, creates a three-dimensional virtual reality world of financial information. The virtual reality world presents specific financial information as three dimensional objects, or metaphors, as part of the virtual reality world. The user is able to view, manipulate, and travel through the metaphors, which are displayed in such a way to allow are user to easily locate relevant financial information, interact with different characteristics and see financial trends.

Further, the user is able to use the virtual reality world generated by the present invention to funnel information and trends from various sources into one object of the virtual reality world.

In effect, a virtual reality world created using financial information can be considered as displaying a hybrid of financial information and market geography representing a virtual financial world having terrain categorized and structured to enable a user to easily extract patterns and interconnections. Thus, for example, the geography of the virtual reality world (in the representative embodiment, it is market geography), is defined, in part, by a three dimensional coordinate system that sets out the borders of "geographical" features in the terrain. The geography can represent information elements that are non-integer taxonomies of the financial information. Thus, the present invention can map many characteristics of the system being modelled to a representative geography of the system where its taxonomy comes to life as a terrain.

If structured correctly, a virtual reality world has the advantage of presenting a very large amount of information in pictorial form. People can comprehend interactions and interrelationships between information when it is presented visually. Thus, an experienced virtual reality user can easily see, comprehend and remember complex interrelationships between items of information and, using visual cues, take advantage of the natural perceptual process of the human mind that processes visual information. This is particularly important for money managers and financial analysts who daily use large volumes of financial information from variety of sources.

The present invention, in a representative embodiment, comprises four modules. An input module continuously receives a stream of financial information. In the representative embodiment, this stream comprises real-time data about financial markets and is pre-processed by a financial analytic system. The second module, a user interface module, allows the user to input criteria to select certain parts of the stream of financial data for display and to input display settings for the virtual reality world and metaphors in the virtual reality world. In effect, the user interface module allows the user to define his or her virtual reality worlds. The third module, a filter module, selects the parts of the stream of financial data for display in the virtual reality world based upon the criteria input by the user. The fourth module is a virtual reality generator that generates and continuously modifies the virtual reality world representing the financial data. The virtual reality generator allows the user to "travel through" the virtual reality world and to select metaphors in the virtual reality world for detailed display.

The input module in the representative embodiment takes as input information structured by an analytic system. (In alternative embodiments, the input can be received from a knowledge base, neural network, artificial intelligence system or any system that structures or categorizes data.) An analytic system organizes and structures raw financial information into various forms commonly used by money managers and financial analysts. In the representative embodiment, the analytic system that produces the pre-processed stream of financial information is the CAPRI financial analysis system, produced by Maxus Systems International of New York, N.Y. The CAPRI analytic system itself receives as input real-time, financial data from on-line services such as the Reuters' and the Knight-Ridder Inc.'s digital data feed servers. The CAPRI analytic system takes this information (in the form of "raw" financial data), and using financial models and analysis techniques, builds a database of financial information. Systems such as the CAPRI analytic system are also able to store financial information for later analysis. (The CAPRI analytic system can display the financial data in standard spreadsheet-like windows operating in a Microsoft Windows environment. It also allows a user to export information to other application programs, a feature used by the input module of the present invention.) For example, the CAPRI analytic system allows a user to define areas of interest from large areas of financial information, and then create price and volume charts for any stock issue, including futures, stocks, indexes, currencies, bonds and commodities. The CAPRI analytic system, for example, can provide a graphical profit and loss and risk evaluation analysis for options strategies, create price volume charts including intra day charts with real time updating, create options strategies that can be saved for future analysis, undertake time, bond and futures analysis, and analyze and screen financial data (and generate reports) using techniques such as moving averages, momentum, Wilder's relative strength, stochastics and ordinary least squares. In the representative embodiment, the CAPRI analytic system is used to feed in real-time complex and voluminous financial information to the input module. In short, the more functions that the analytic system performs, the more functions that can be mapped to a virtual reality world.

The input module, in other embodiments, can be designed with simple modifications to receive input from rule-based expert systems (such as the Level5 Object program), neural networks that learn (such as the BRAINCEL neural network add-in for the EXCEL brand spreadsheet program by the Microsoft Corporation), knowledge bases that use fuzzy logic and the like. It is preferred if these input sources are DDE or OLE compatible, as explained below, to enable easy interaction and sharing of information.

The analytic system, as described above, requires a real time data feed. Alternatively, financial data can be entered manually into the analytic system or can be imported in batches and stored in the analytic system. In such cases, the analytic system would not operate in real time and therefore the virtual reality generator would not operate in real-time.

The analytic system that passes data to input module in the representative embodiment must be able to export financial data. For example, the CAPRI analytic system is able to export financial data to the Microsoft Excel spreadsheet program via the dynamic data exchange ("DDE") protocol in real-time. The DDE protocol is used by the input module of the representative embodiment to receive a stream of financial information. (In the representative embodiment, the input module, the user interface module and the filter module are all DDE and OLE compatible.) The financial data received by the input module can be that selected for display by the user using the user interface module, which interacts with the input module to request (using DDE protocol commands) selected financial data. In an alternative embodiment, the input module can be coupled directly to the financial data feed, such as the Reuter's data feed. On such an embodiment, the input generator requires a sub-module to interpret the data feed into a form recognized by the virtual reality generator. In another embodiment, the virtual reality generator can store, in an associated database, the financial information that is required to create the virtual reality world. In such circumstances, the virtual reality generator does not operate in real time. In a further embodiment, the input module of the present invention can be coupled to an application program, such as a spreadsheet program or a database program, and access financial information that is stored in such a program. The input module would therefore communicate with the application program using a protocol recognized by the application program.

The virtual reality generator of the preset invention generates a virtual reality world from the inputted financial information. The virtual reality world represents the financial information. In the representative embodiment, the virtual reality world is constantly changing to represent changes in the financial information. For example, if the financial information concerns the futures market, the virtual reality world could represent the current state of the futures market.

The following is an example of a virtual reality world that can be generated by the virtual reality generator of the present invention. The virtual reality world is defined by the use of the user interface module. Assume that the user has selected as the virtual reality world the stock markets of Tokyo and New York. The user may designate that the three-dimensional virtual reality world be divided into a grid comprising for squares. One of the axis of the grid will represent the two stock markets, the other axis will represent two industry groups, such as "financial" and "industrials". Therefore, one square on the grid represents, for example, New York Industrials. Each square on the grid can be further divided to represent industry sub-groups for that market. Each stock is represented by a metaphor, for example, a polygon. The numbers of sides of the polygon can be selected by the user to represent, for example, the degree of capitalization of the stock. The color of the polygon can represent, for example, profit or loss. The height of the polygon (above or below the plane) can represent, for example, the price change or volatility of the stock. Polygons representing companies that are about to declare a dividend can be made to spin. Companies in bankruptcy can be represented by a flashing polygon. Each company's corporate logo can be textured on the top or side of the polygon. Visual arrow vectors, whose dimensions represent information about financial movement, can be coupled to a polygon to represent trends. Polygons that spin or blink can represent the results of the best 50 stocks selected by a certain criteria from a database. Other visual ques can be used to represent financial information about the stocks, as selected by the user.

The shapes, colors, positions, animations and textures of the metaphors can be selected by the user to represent different characteristics of the financial data.

Several incoming data streams can be the source of the financial information for one virtual reality world. (The sources can be combined by the analytic system or by the input module. In the representative embodiment, the sources are combined by the CAPRI analytic system.) As the financial data changes, the position, shape, color and texture of the metaphors in the virtual reality world also change.

The virtual reality world created by the virtual reality generator of the present invention allows the user to "fly" through a virtual world representing financial information. As another example, assume that the virtual reality world designed by the user concerns one stock market arranged by industry groups and sub-groups. The user can position himself or herself in the virtual reality world so that the user has a bird's eye view of the stock market. In the example, the stock market could be represented as a grid pattern of geometric primitives, such as polygons or cubes, on a geographic-like terrain. Navigating with a device such as a spaceball, the user can then "fly" down to ground level and view the financial information from this perspective, to see which stocks are situated above or below ground level. For example, if the stock information depicted as a polygon is the trading price of one stock relative to the prior weeks' moving average of the stock, the user can fly down to ground level and view whatever stock is trading up (above average) or down (below average) depending on whether the polygon is above or below ground level.

Many financial indicators can be specified by the user using the user interface module. The user is presented with a virtual reality world of selected financial information where location, colors, sounds, shapes and movement all specify financial information that the user has requested information about. (This information may also include information about positions a user has in his or her portfolio.) The user, examining and moving through just one screen (i.e. the virtual reality world in three dimensions) can immediately spot important information. The user can then zoom in on this information (for example by flying to this polygon) and view all the information available about this instrument. This information can be presented on a separate screen or can be presented as part of the virtual reality. If the user flies down and selects an instrument, in an alternative embodiment, the user is able to receive verbal or sound information about the instrument.

Additionally, the user can be "positioned" so that the user feels like he or she is in the cockpit of a fighter plane, and navigate this plane around the virtual reality world. Instruments on the planes control panel can represent other information. For example, the user has the option of defining a characteristics seeking missile to be launched from the plane. The user may define the missile as a profit seeking missile (using a preselected definition of profit). When activated, profit seeking missiles will zoom in on, for example, the stocks that are the most likely to be profitable.

BRIEF DESCRIPTION OF THE DRAWINGS

FIGS. 5a to 5c are examples of the sampled filtered input received by the input module of the present invention.

DETAILED DESCRIPTION

Figure 1:
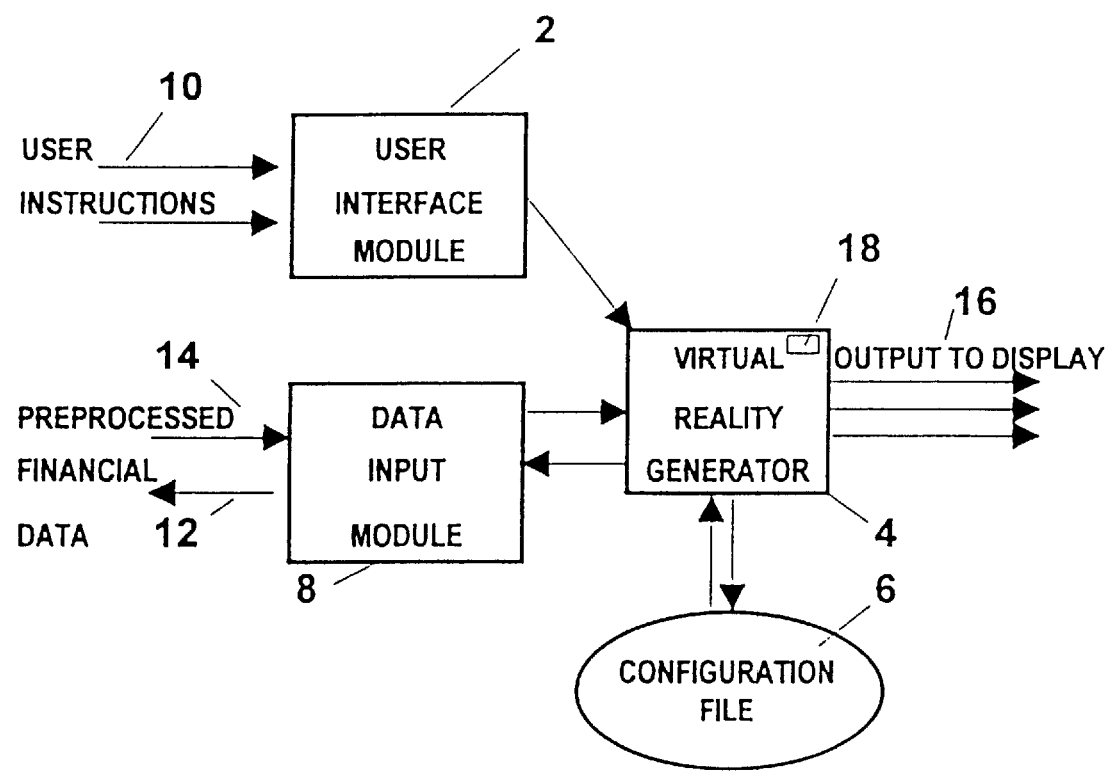
FIG. 1 is a block diagram of the modular structure of a representative embodiment of the present invention.

Referring now to the drawings, and initially FIG. 1, there is illustrated a representative embodiment in block diagram form, of the modular structure of the present invention.

A user interface module 2 is used by a user to input user instructions 10, such as display parameters and filter parameters. The user instructions 10 also comprise instructions to create a virtual reality world, to store the parameters for a virtual reality world in a configuration file 6, and to retrieve the parameters for a stored virtual reality world for the configuration file 6. The user instructions 10 are interpreted by a virtual reality generator 4 to create a virtual reality world.

The virtual reality generator 4 interprets the user instructions 10 and coordinates interaction with the configuration file 6. Using the user instructions 10, the virtual reality generator causes an input module 8 to obtain from an analytic system (not shown), using queries 12 understandable by the analytic system, pre-processed financial information 14 that complies with the user instructions 10. This financial information is supplied to the virtual reality generator 4.

Using information in the configuration file 6 and where required the financial information supplied by the input module 8, the virtual reality generator 4 creates a virtual reality world which is output 16 on a display device (not shown). The virtual reality generator 4 uses functions from a toolkit 18 to create and manipulate the virtual reality world.

In an alternative embodiment, the pre-processed financial information 14 is supplied to the input module 8 in pockets at periodic intervals. The packets may or may not be in response to queries 12 from the input module 8. For example, the pre-processed financial information 14 may be supplied in flat table form to the input module 8 every four hours. The input module 8, with reference to the user instructions 4, selects from the packet the financial information to be used by the virtual reality generator 4. In this embodiment, the analytic system can be a database and need not be permanently connected to a real-time source of financial information. It is useful for the database, when updated, to record what information has been updated, and supply this information to the input module 8 to simplify processing.

Figure 2:
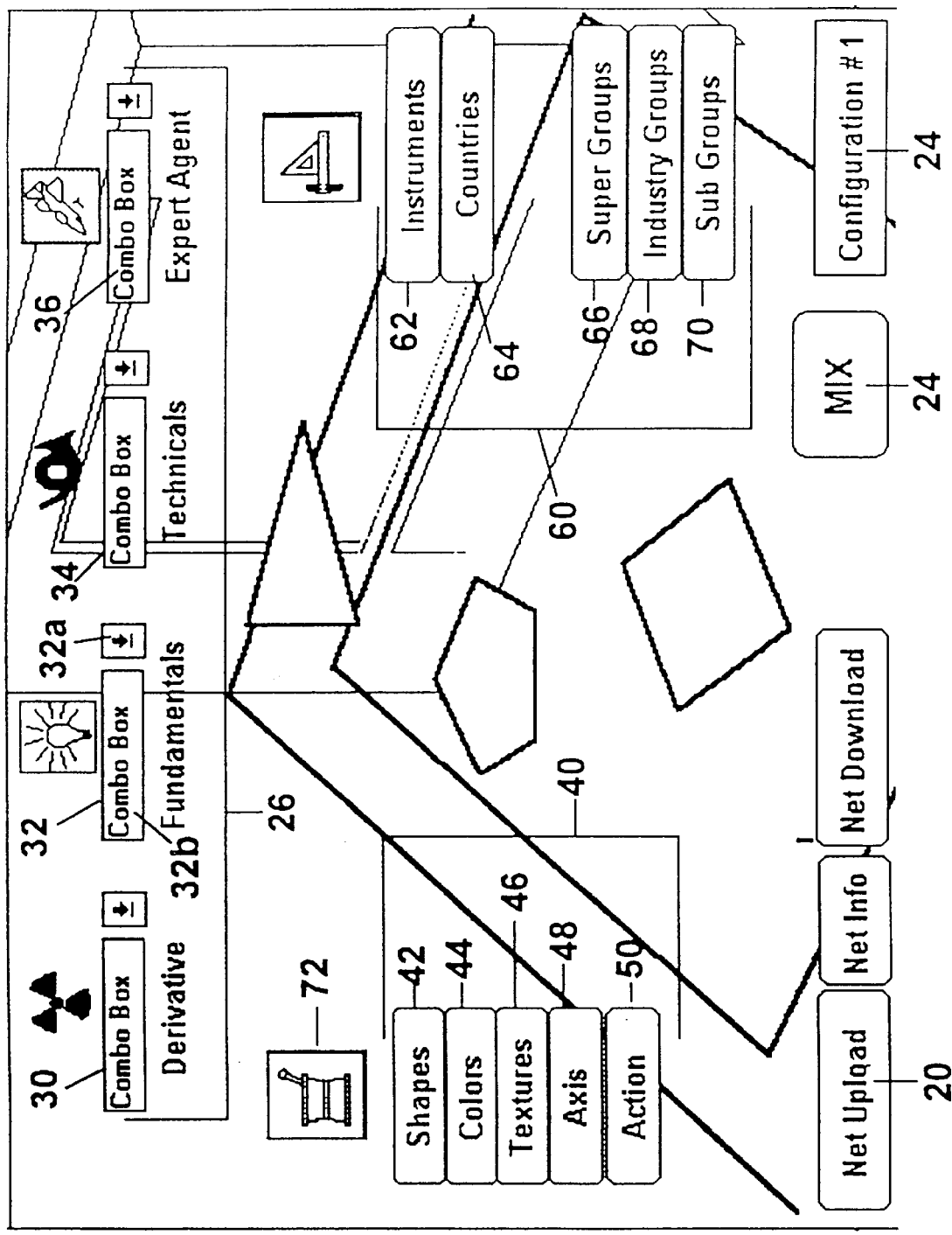
FIG. 2 is an example of the interface panel generated by the user interface module of the present invention.

Referring now to FIG. 2, there is illustrated a representative embodiment of an interface panel 20 controlled by the user interface module 2 of the present invention.

The interface panel 20 is used by a user to input parameters to define a virtual reality world and to instruct the present invention to create a virtual reality world. The interface panel (as well as the other user interface cards explained below) in the representative embodiment uses the Microsoft Windows 3.0 protocol. Users interact with the interface panel 20 using standard GUI commands.

The input module 8 of the present invention allows the user to define a virtual reality world. The input module 8 in the representative embodiment of the present invention causes a window to be displayed on a computer monitor. The window generated by the user interface module 2, in the representative embodiment, has five sections.

The first section is a virtual reality world indicator 22. The virtual reality world indicator 22 allows the user to nominate which virtual reality world the user desires to define or view. Each virtual reality world can be represented by a configuration number to allow the configuration of the virtual reality world to be saved and retrieved. For example, ten virtual reality worlds can be saved at the one time in the representative embodiment. Once a virtual reality world has been defined by a user, the definition can be saved for later use, and is saved and retrieved using the virtual reality world indicator 22.

The second section of the window generated by the user interface module 2 comprises a mix switch 24. The mix switch 24 in the representative embodiment is a mix button which can be activated by a user. Activation of the mix button will cause the virtual reality generator 4 to create the virtual reality world as indicated by the virtual reality world indicator 22. In alternative embodiments, the mix switch can be used to save the configuration of the current virtual reality world in the configuration file 6.

The third section of the window generated by the user interface module comprises a set of action indicators 26. Action indicators 26 allow the user to determine how certain features of the financial information will be displayed or highlighted in the virtual reality world. The action indicators 26 are used to set display parameters. For example, an action may be the flashing of an object or the spinning of an object. If the metaphors used are polygons, the action indicators can define which metaphors will be spinning polygons and flashing polygons.

In the representative embodiment, there are three action indicators, a spinning indicator 30, a flashing indicator 32 and a sound indicator 34, and one special action indicator 36, a profit (or other characteristic) seeking missile, as explained below.

In general terms, the action indicators 26 can be used to define areas of interest concerning three types of financial information, often called analytic types: derivatives, fundamentals and technicals. Derivatives are parameters relating to options on a stock, bond, commodity or future, as well indexes (such as the theoretical Black-Scholes value of options on the Standard and Poors's 100 index) and warrants. Fundamentals are particular parameters defining a company's financial performance, for example, a company's price/earnings ratio or price/growth ratio. A technical is a financial parameter about a stock relative to a broad market index, such as the S&P 500 index or an indicator, like a moving average, price momentum or relative strength. By using the action indicators 26, the user can select a criteria from the lists of fundamentals, derivatives and technicals for each action indicator 26, as explained below with reference to FIGS. 10 and 11. The user can define his or her own fundamental, derivative or technical for an action indicator 26.

An expert agent (or expert action) is a special analytic type. An export agent is a user defined complex financial analysis program, sub-program or formula that can be linked to the present invention. An example of an expert agent may be a neural network, rule-based expert system or news wire service that produce a list financial instruments. For example, a rule-based expert system could produce a list of the ten most promising stocks.

For each action indicator 26, the user is able to define, specific areas of interest such as a specific derivative, fundamental or technical. For example, the flashing indicator 32 could be defined in relation to a fundamental as all industrial stocks having a price earnings ratio of the relative industry group greater than six. In the virtual reality world, all metaphors representing industrial stocks with price earnings ratios greater than six will be displayed as flashing metaphors.

By way of example, the flashing indicator 32 in FIG. 2 has been nominated by the user to be a fundamental action. (The user used the screen display of FIG. 11 to nominate the category as "fundamental" as explained below.) The user could have alternatively chosen 'derivative', 'technical', or 'expert agent'. By using an icon 32a, the user is able to list all defined fundamental actions. (The defined fundamental actions are specified and defined using the interface card of FIG. 9.) The user can chose a fundamental from the list. The chosen fundamental is displayed in combo box 32b.

The special action indicator 36 is, in the representative embodiment, a characteristics seeking missile. The user defines a financial characteristic, for example profit, bankruptcy, or volume. Using known analytical formulas, the virtual reality generator 4 of the present invention will seek out the area or areas in the virtual reality world that best satisfy the characteristic defined by the user. For example, if the user selects as the characteristic profit, thus defining a profit seeking missile, the virtual reality generator 4 can be used to "seek out", for example, stocks that are likely to generate a profit. In the virtual reality world generated by the virtual reality generator 4, the profit seeking missile, when activated, will fly through virtual reality world to the most profitable stocks, thus being a highly visible que for the user. The user can define the characteristic of the special action indicator 36 using a define section in the window generated by the user interface module 2. The user can activate the characteristic seeking missile from an input device, such as a button on a trackball. In alternative embodiments, other actions can be given to the special action indicator 36. For example, the special action indicator 36 may be a cockpit display where the instruments, as defined by the user, represent financial information and the user's position in the virtual reality world.

The fourth section of the window generated by the user interface module is a display parameters section 40. The display parameters section 40 allows the user to set display parameters for objects in the virtual reality world. In the representative embodiment, there are the display parameters include shape, color, texture and axis. A shape display parameter determines what the shape of the object in the virtual reality world signifies. For example, the user may set a three sided metaphor to represent stock having small capitalization, a four sided metaphor to represent stock of medium capitalization and a five sided metaphor to represent stock of large capitalization (where small, medium and large capitalization are further defined by the user). A color display parameter 44 may be set to indicate, for example, companies making a profit or a loss. Thus, a blue metaphor in the virtual reality world may represent a company making a profit and a red metaphor may represent a company making a loss. (The colors of the metaphors can be of various shadings, representing degrees of profit and loss.) A textures display parameter 46 allows the user to set identifying symbols for each object in the virtual reality world. For example, the user may set the textures display parameter 46 so that national flags, representing stocks trading on stock markets in foreign countries, are placed on each metaphor representing a foreign stock. Or a corporate logo may be placed on an object in the virtual reality world to identify it as representing a stock of that corporation. In the representative embodiment, the display parameters in the display parameter section 40 are set by activating the appropriate labeled button, causing a further interface card to be displayed which allows the user to set the various parameters.

Additionally, in a representative embodiment, an action parameter 50 allows the user to specify what input stream is to be used as input to the input module 8 for processing by the virtual reality generator 4 and what parts of the information from that input stream are of interest to the user. For example, in the representative embodiment, the user will specify that the input stream is the output of the CAPRI analytic system and can then specify what sub-set of the possible information that can be generated by the CAPRI analytic system is to be displayed. (In the representative embodiment, the user's selections are translated by the user interface module into a form that the CAPRI analytic system can understand. The CAPRI analytic system will then output to the input module 8 of the present invention only that information that satisfies the defined queries. For example, the user's selections are translated into the form as specified in the CAPRI manual, Chapter 19. In particular, the queries sent to the CAPRI analytic system conform with the DDE protocol and are of the form set out in Chapter 19.4 of the CAPRI manual. Alternatively, the input module 8 can receive packets of information, for example, in a form illustrated in FIGS. 4a–4c. The input module 8 screens this information based upon the display parameters and filters that were set by the user.

In other embodiments, as discussed above, a data base containing financial information can be used in place of the analytic engine. For example, financial information can be stored in an application program data base. In such a case, the query generated by the virtual reality generator must be in a form understood by the database application program. Therefore, the action parameter 50 is used to specify what file or application program is to be the source of the financial data input and sets actions to take place on that file or by that application program to screen the information that is input.

Figure 10:
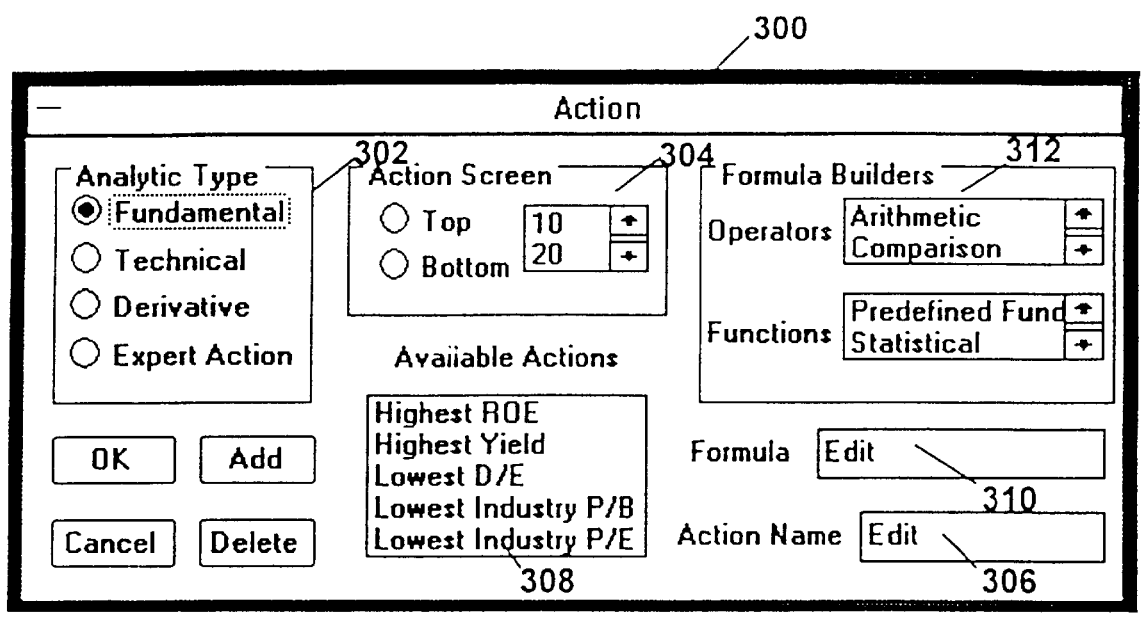
FIG. 10 is an example of an action user interface card generated by the user interface module FIG. 1.

In particular, the action parameter 50, in the representative embodiment, is a button that, when activated, causes the interface card of FIG. 10 to be displayed. This interface card enables the user to set and define available actions for each analytic type. These actions can be linked to an action indicator 26.

An axis display parameter 48 allows the user to set the Z-axis (sometimes called the vertical axis) of the three dimensional virtual reality world. (The X-axis and and Y-axis are set as discussed below with reference to FIG. 11.) Generally, the three axes can represent any category of financial information. For example, one axis can be set to represent countries, a second axis can be set to represent industry groups and a third axis can be set to represent price changes. Alternatively, the user could set the first axis to define two stock markets, for example New York and Tokyo, the second axis to represent two types of stocks, for example utilities and financial, and the third axis to represent percentage change in value of the stock over any user defined time period. Alternatively, the user could set the first axis to represent industry groups in a country, the second axis to represent option maturity dates and the third axis to represent price or volatility.

In the representative embodiment, the Z-axis is set using the axis display parameter 48. Examples of common settings for the Z-axis include an issues, percentage change over any user defined time period, Loday's price of an issue relative to a moving average over any user defined time period, the price of an issue relative to an average of the high/low price over any user defined time period and the price of an issue relative to any broad market index over any user defined time period.

The user has total flexibility to set the virtual reality world display parameters 40 so that the virtual reality world generated by the virtual reality generator 4 of the present invention is a representation of the financial information which interests the user. For example, the shape display parameter 42 can be set to represent three degrees of any financial information that the user desires. The interface cards of the representative embodiments illustrated are a convenient way to allow a user to specify the makeup and composition of a virtual reality world, using financial categories commonly used by money managers. The user interface module 2 of the present invention can be designed to suit the needs of each user and display interface cards and have various filters that allow the virtual reality world to be created with great flexibility. Accordingly, the interface cards discussed are for illustration only and are not intended to limit the broad concepts and uses for the virtual reality world of the present invention.

The fifth section of the window generated by the user interface module is a filter section 60. In the representative embodiment, the filter section allows the user to set parameters so that a filter module or the input module 8 can select the parts of the stream of financial data 14 for display. The parts of the financial data which are displayed in the virtual reality world depends upon the criteria input by the user in the filter section 60 of the window generated by the user interface module 2.

In the representative embodiment, there are five filters that can be set using the filter section of the window generated by the user interface module, namely, an instruments filter 62, a countries filter 64, a super-group filter 66, an industry group filter 68 and a sub-group filter 70.

Figure 6:
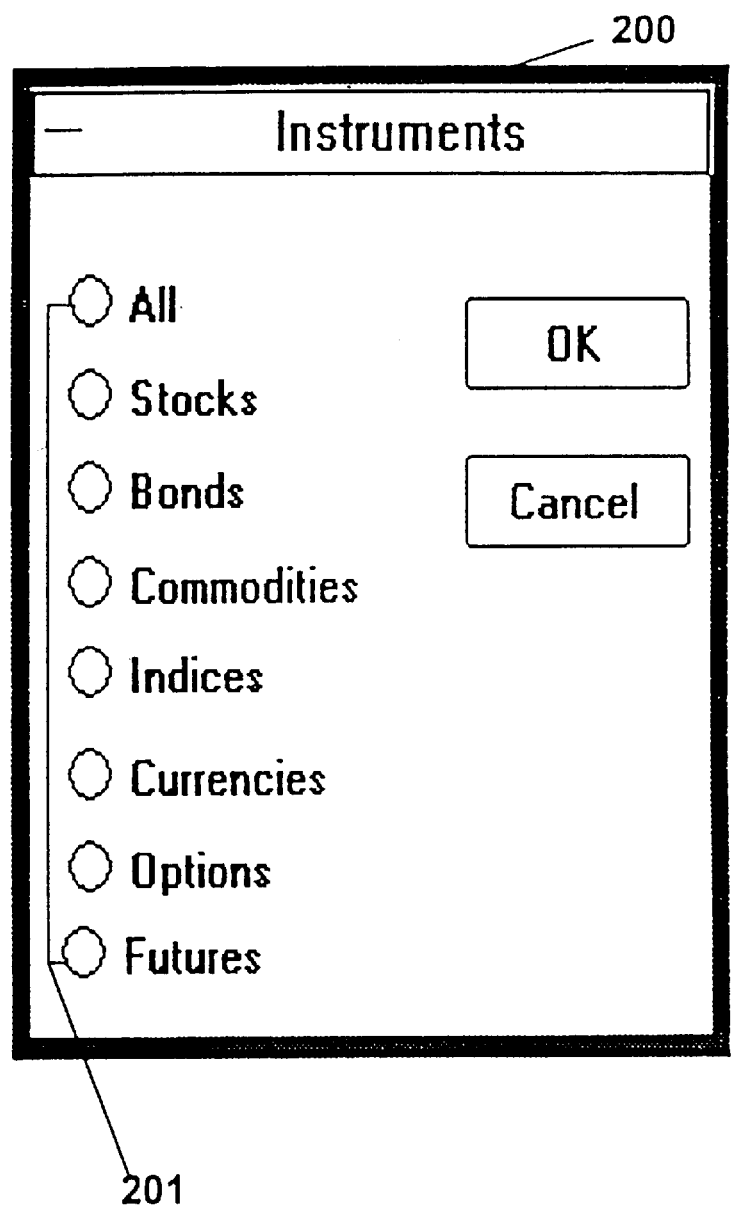
FIG. 6 is an example of the instruments user interface card generated by the user interface module of FIG. 1.

The instruments filter 62 allows the user to select any combination of financial instruments for display in the virtual reality world (see FIG. 6). All possible instruments can be displayed, including stocks, options, futures, commodities, financial indexes, foreign exchange, bonds, and mutual funds. For example, if the user was only interested in stocks and bonds, the user could select, using the instrument filter 62, stocks and bonds so that the virtual reality world comprises financial information concerning stocks and bonds, and no other instruments.

The countries filter 64 allows the user to specify countries. The financial information displayed in the virtual reality world will be that related to the specified countries. Also displayed are the country's exchanges to which the user is able to access.

The super-group, industry group and sub-group filters (66, 68, 70) allow the user to specify and define groups of financial information about types of industries. For example, the super-group filter 66 can be used to filter for display information about any combination of industries, such as utilities, financial, industrials and the like. Using the industry group filter 68, the user can select specific industrial groups such as computers, construction, auto, and the like. Using the sub-group filter 70, the user can select for display particular sub-groups of industry groups, such as information about auto manufacturers that make light trucks.

The five filters described above are examples of the types of filters that can be used to select for display areas of financial information. The user interface module 2 uses the filters, as set by the user, to filter out the information for display that is of interest to the user. In the representative embodiment, the user interface module interprets the filters set by the user and only requests financial information the analytic system that satisfies the filters. Alternatively, the filters can be used to screen packets of information supplied to the input module 8.

When the user activates the mix switch 24, the virtual reality generator 4 is activated. The virtual reality generator 4, when activated, first stores display parameters, the action indicator settings and the filters as configurations in the configuration file 6. In the representative embodiment, the configurations are used to define the display of the virtual reality world and filter the input stream of financial information 14. The virtual reality generator 18, using the configurations, constructs the virtual reality world in conformity with the configurations. In the representative body embodiment, the virtual reality generator 4 instructs the input module 8 to obtain information that satisfies the configurations from the analytic system. (The input module 8, in the representative embodiment, can use the information in the configuration file 6 to query the analytic system. The analytic system uses the queries 12 to provide the relevant information to the input module 8, which feeds that information to the virtual reality generator 4.)

In a further embodiment, the virtual reality generator 4 can query a plurality of analytic systems and knowledge base systems arranged in a network. For example, each analytic system can be connected to a separate real-time source of financial information. The virtual reality generator 4 can then send queries 12 to the network which will be directed by the network to the correct analytic system.

Once the input stream of financial information is defined and an initial set of financial information has been input from this stream, the virtual reality generator 4, using the configurations in the configuration file 6, creates the virtual reality world. In the representative embodiment, the virtual reality world is implemented by the virtual reality generator 4 using the WorldToolKit library of C-language routines, developed by the Sense8 Corporation of Sausalito, Calif. The virtual reality generator, using this library of routines 18, redraws the virtual reality world 30 times per second. This, in effect, allows for real-time simulation of movement through the virtual reality world.

In the representative embodiment, a 486 microprocessor manufactured by the Intel Corporation and in Intel DVI 2 board is used to render the virtual reality images. Alternatively, Risc-based workstations from IBM, Sun Microsystems Inc., Silicon Graphics Inc. or the Digital Equipment Corporation could be used. A 20 inch NEC color monitor is used to display the virtual reality world. The input/output of the present invention is DDE compatible and operates under the Microsoft Windows 3.0 or higher operating system protocol.

Figure 3B:
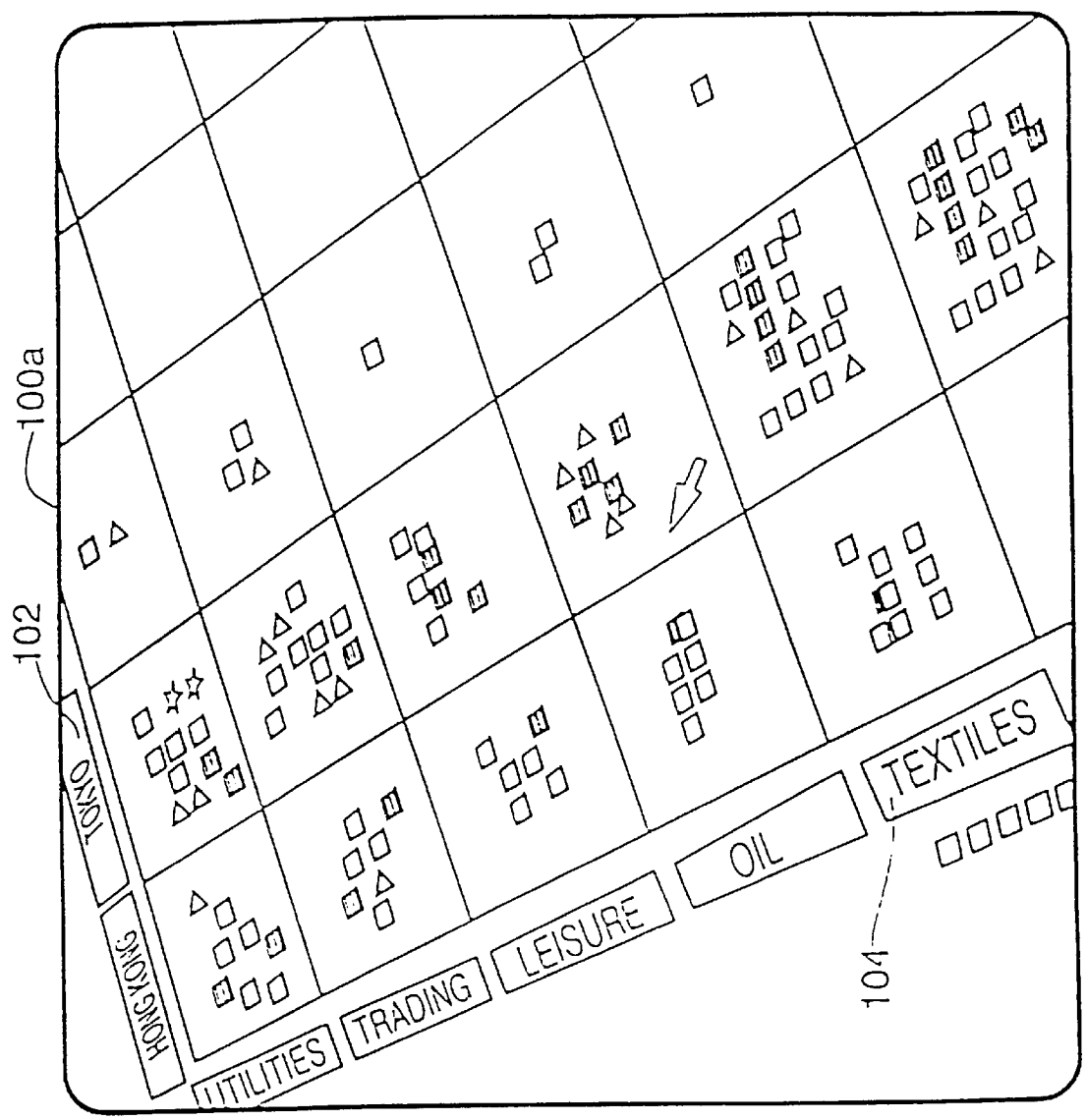
FIGS. 3a to 3d are examples of a typical screen displays generated by the virtual reality generator of the present invention.
Figure 3A:
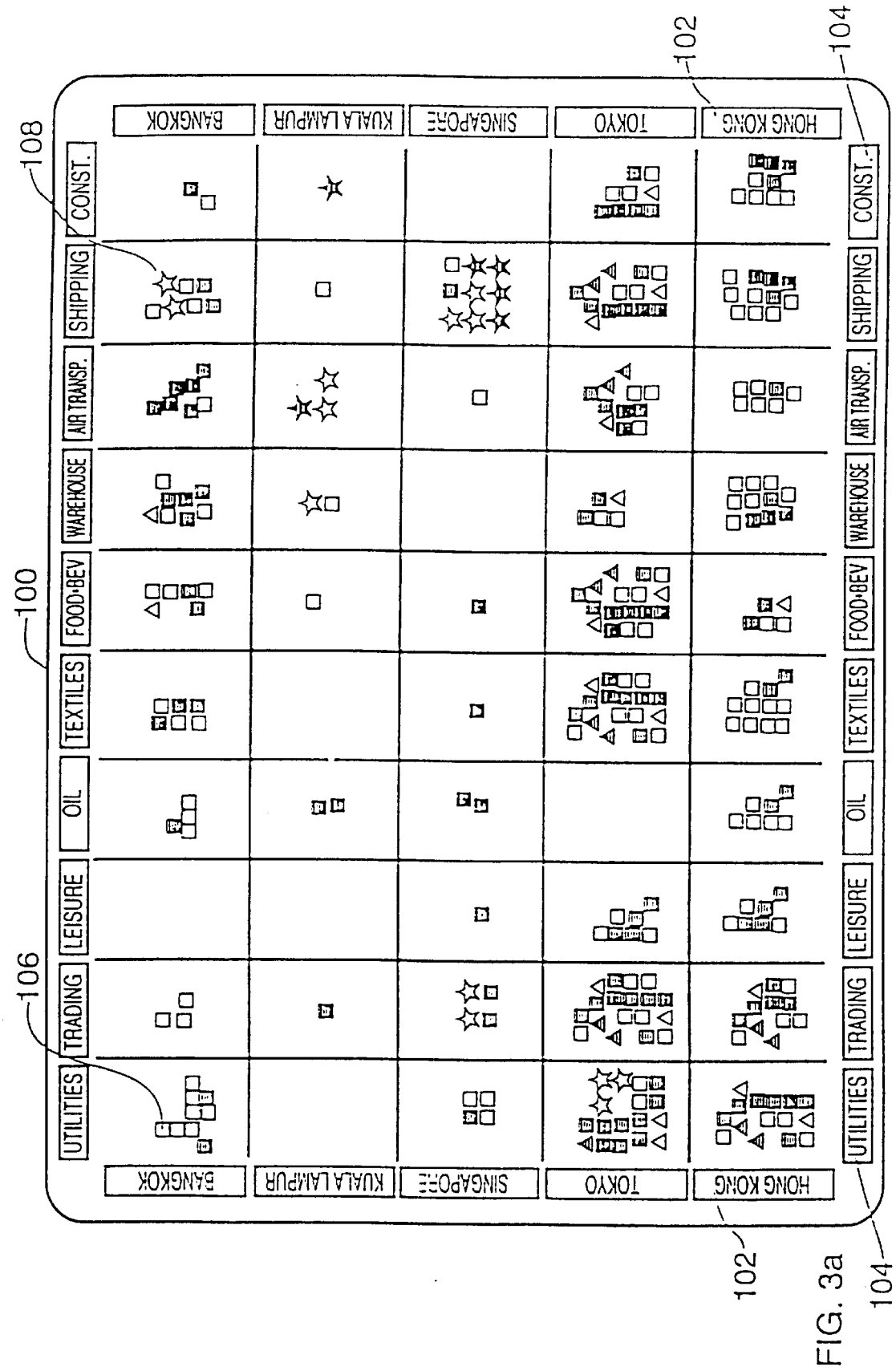

Referring now to FIGS. 3a–3d, these are illustrated four typical screen display generated by the virtual reality generator 4 of the present invention. FIG. 3a shows a top perspective 100 of a virtual reality world. In this example, stock markets are the parameters for a first set of a axis 102 and industry groups are parameters for a second set of axis 104. A financial instrument is displayed represented by a metaphor, being a geometric primitive, such as a polygon or cube (e.g. 106 and 108.) The metaphors are, from this perspective, two-dimensional. When the user travels through the virtual reality world, it can be seen that the world and the primitives are in effect three-dimensional. The colors and shape of the metaphor are significant, as discussed above.

FIG. 3b shows the same virtual reality world as FIG. 3a from the perspective (100a) of a user moving through the virtual reality world.

Figure 3C:
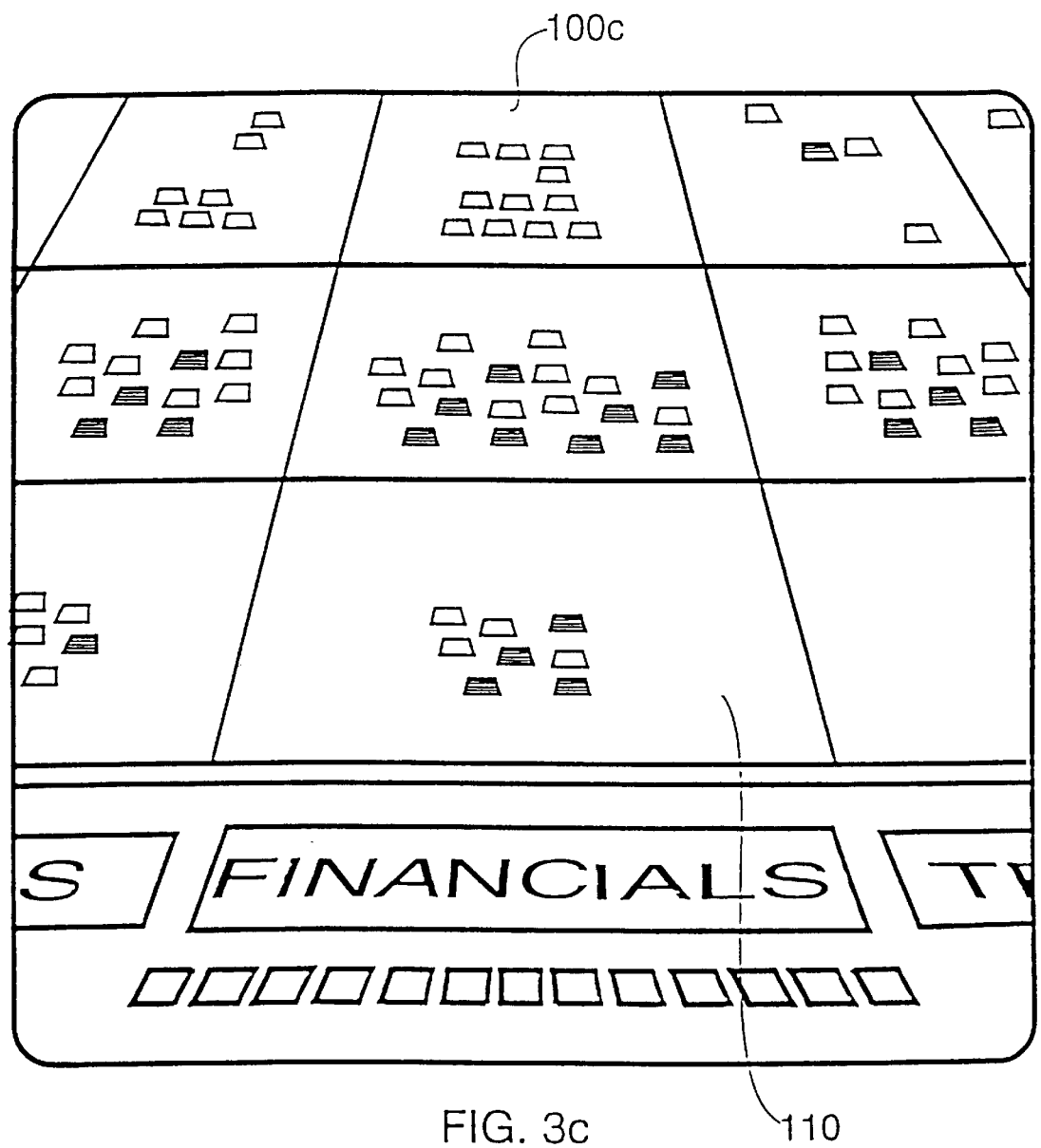

FIG. 3c shows a further perspective (100c) of the same virtual reality world as in FIG. 3a. The area of the virtual reality world 110 in central view consists of information concerning Hong Kong financials.

Figure 3D:
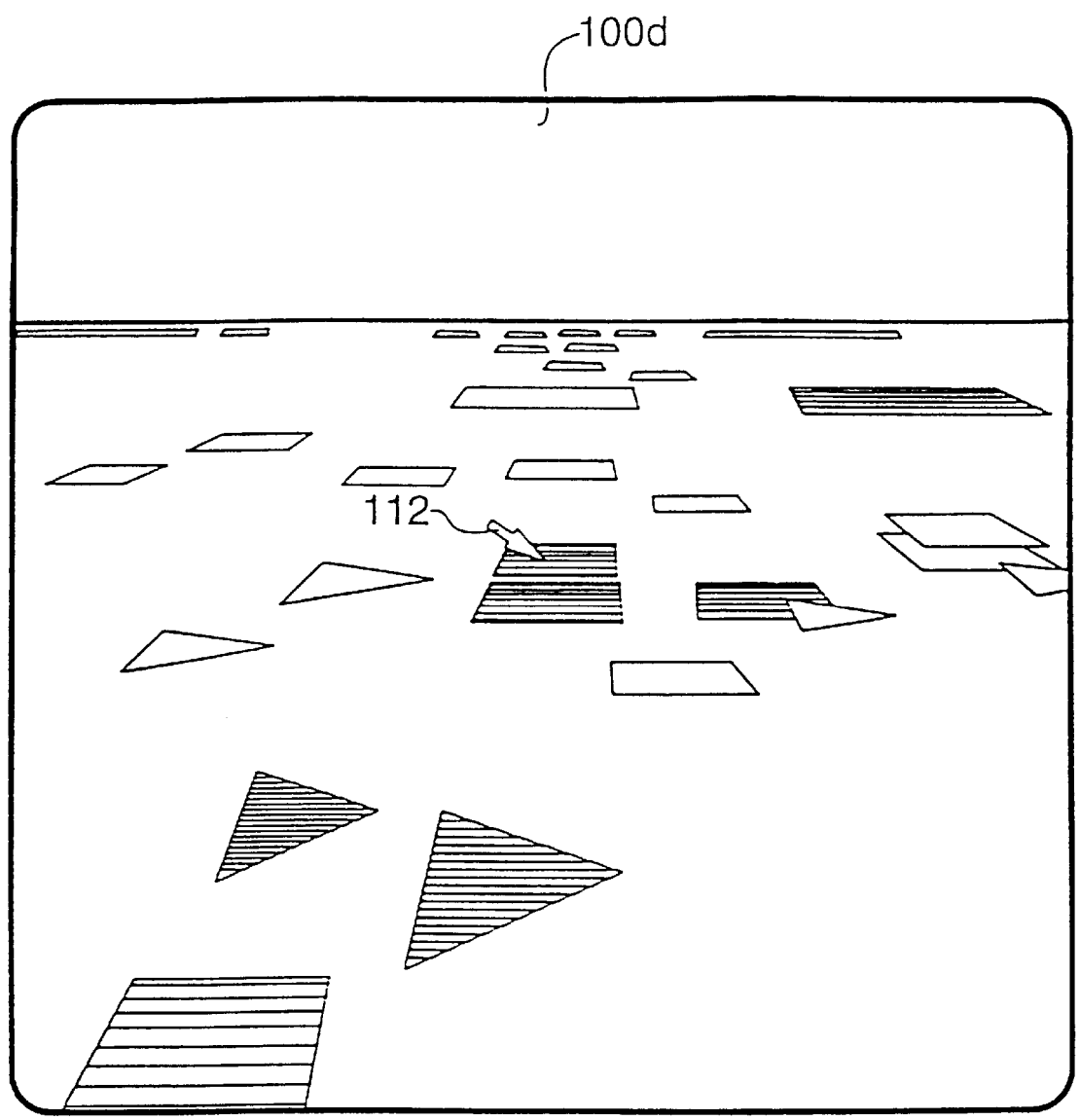

FIG. 3d shows the same virtual reality world as FIG. 3a from the perspective (100d) of a user "located" at ground level in the virtual reality world. The different shaped metaphors can be clearly seen. The height relationship of a metaphor represents financial information. A pointer 112 allows a user to select a metaphor so that further information can be displayed (either visually or through sound or both) to the user about the financial instrument represented by the selected metaphor.

As is apparent from FIGS. 3a–3d, the virtual reality world is three-dimensional which the user can travel through.

Figure 4:
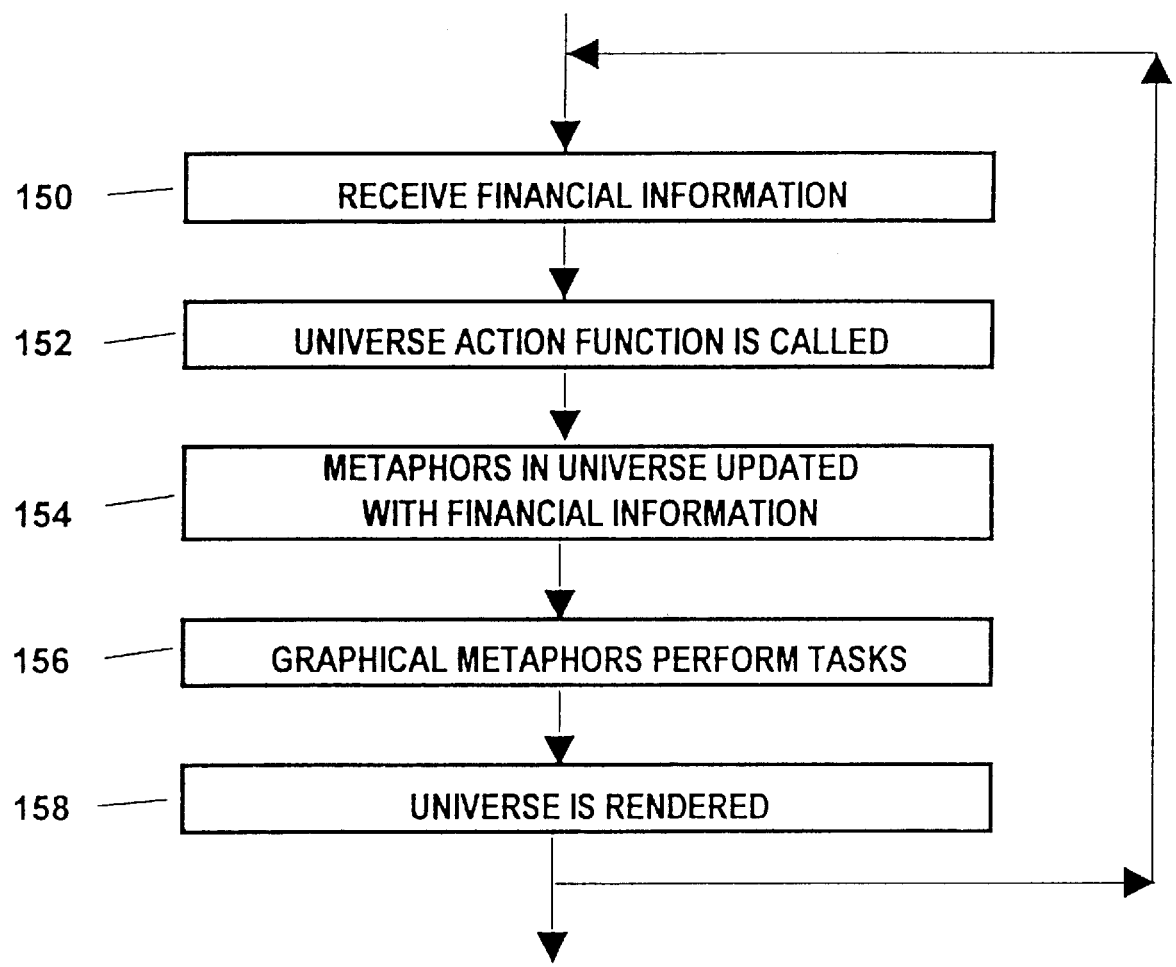
FIG. 4 is a flow chart indicating the flow of control of the virtual reality generator of FIG. 1.

Referring now to FIG. 4, there is illustrated in flow chart form the simulation loop used by the virtual reality generator 4 of FIG. 1 to render a virtual reality world.

At step 150, the virtual reality generator receives financial information. This information could be received in response to a query 12 to an analytic system or database of preprocessed financial data. Alternatively, the input could be received at regular intervals in predetermined packets of financial information.

At step 152, an action function is called. The action function is related to a universe and the metaphors it contains and defines and controls activity in the simulation. In the action function, events involving metaphors, graphical or otherwise, can be specified. (Examples of events which might be specified in the action function include (a) program termination in response to the user processing a button or a mouse; (b) simulation of changing lighting conditions; (c) event handling for the virtual reality world, such as when a metaphor is selected by the user.)

At step 154, the metaphors in the universe are updated based upon any new financial information received.

At step 156, the graphical metaphors are set to perform any user defined tasks, such as spinning or blinking.

At step 158, the universe is rendered on a display device. Steps 150 to 158 are repeated until the user gives a predetermined stop command.

As required, the steps above, in the representative embodiment, may involve function calls to a World Toolkit functions that perform the task of simulating a virtual reality world, and if required, function calls to the input module 8. When necessary, the virtual reality generator 4 accesses the configuration file 6 to obtain parameters concerning the virtual reality world and the metaphors.

Referring now to FIG. 5, there is illustrate an example of the input 14 received by the input module 8 of FIG. 1.

In a representative embodiment, the input is received in three files or packets, namely FUND.PRI, DAILY.PRI and SPIN.PRI. The input can be received in response to a query 12 from the input module 8 or at regular predetermined intervals. All input files, in the examples, are in the Reuter's symbol format. The files can be stored in a memory and accessed by the present invention or they can be input as often as required.

FIG. 5a is an example of the contents of the FUND.PRI input file, which contain fundamentals information. (This file can be generated by a database program or analytics system. Alternatively, it can be manually entered into the input module 8.) Each line contains a set of information. In this figure, the first line 170 lists the type of information in each line. (This is not usually input to the virtual realty generator 4 and is for purposes of illustration only.) Taking the last line 172 as an example, the issue has issue code 7267. The type of issue is "S" (for stock). (Other types of issues include "I" for index and "IF" for futures). The dividend was 10. The Book Value was 800. Earnings were 70. Estimated earnings are 82. There is no entry made for the Sedol Holdings number or market capitalization in this file. The name of the stock is "Honda Motors" and the industry group is "Autos".

FIG. 5b is an example of the contents of DAILY.PRI file The DAILY.PRI file is named after the date on which the information in the file relates, in this example, "122191" for Dec. 21, 1991. This file can be entered daily, or at more regular intervals if required. It contains information on daily price changes and volatility calculated over a predetermined period.

By way of example, the last line 174 contains information for stock number 023 on the Hong Kong exchange. The last bid for this stock was 38, with a high (in the predetermined period) of 38.25 and a low (in the predetermined period) of 37.5. The volume or stock traded was 3060527. The price change since this previous day was zero.

FIG. 5c is an example of the contents of the SPIN.PRI file. This file contains screened financial information about an issue, such as percentage annual profit and other well-known financial indicators. Each issue, such as the issue marked 176, has information that takes two lines of FIG. 5c. Each item of information (e.g. 178a) relates to the corresponding category listed in the first two lines (e.g. 178b).

Referring to FIG. 6, there is illustrated an instruments cards 200 generated by the user interface module 2 of FIG. 1 when the user activates the instruments filter button 62. Using standard GUI techniques, the user is able to filter (or select) instruments 201, in any combination, for display in the virtual reality world.

Figure 7:
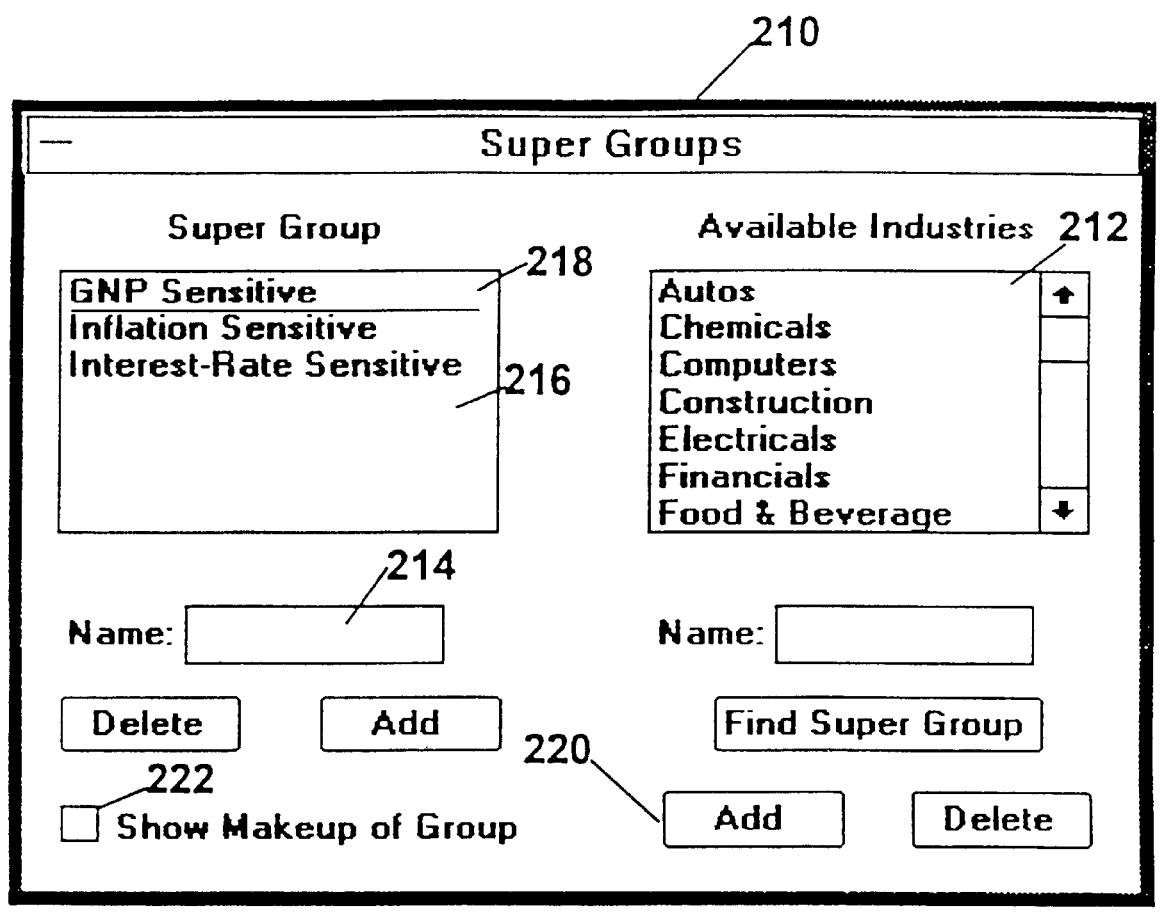
FIG. 7 is an example of a super-groups user interface card generated by the user interface module of FIG. 1.

Referring to FIG. 7, there is illustrated a super-groups Card 210 generated when the user activates the super-groups filter button 66 from the interface panel 20 of FIG. 2. Using standard GUI techniques, the user is able to define for display various super-groups of industries. The user enters a user defined name in a name box 214, which then appears in a super-group box 216, in highlighted form 218. From an available industries box 212, the user selects industry groups to be members of the user defined super-group 218. Once the super-group has been defined the user saves the super-group definition using an add button 220. The composition of a selected super-group 218 can be viewed if the user activates the "show makeup of group" square 222.

Figure 8:
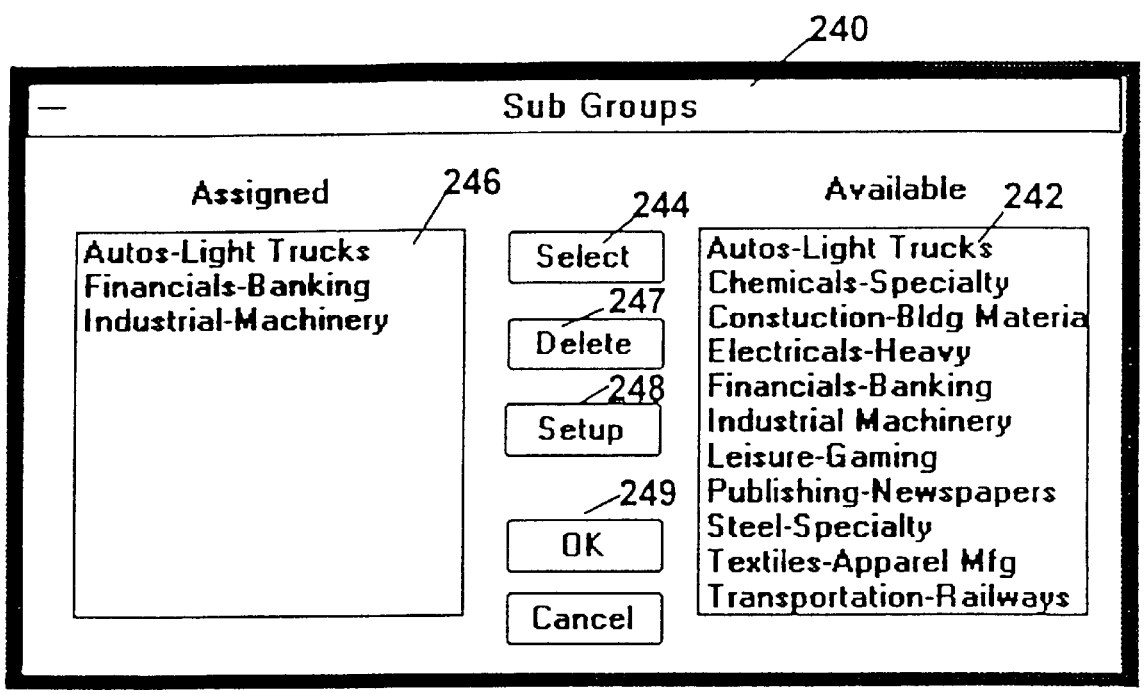
FIG. 8 is an example of a sub-groups user interface card generated by the user interface module of FIG. 1.

Referring to FIG. 8, there is illustrated a sub-groups card 240, which is displayed when the user activates the sub-group button 70 on the interface panel 20 of FIG. 2. The sub-groups card 240 allows the user to select for display various industry sub-groups, or other sub-groups of financial information. From the available box 242, the user selects (using standard GUI methods, e.g., by activating a select button 244) available sub-groups from the available box 242. Selected sub-groups are displayed in an assigned box 246. (Sub-groups can be defined, by a user activating a set up button 248 on the sub-group card 240, which causes to be displayed a sub-group card. The setup sub-group card allows a user to assign industry groups to sub-groups.)

The sub-group card 240 indicates that there a three sub-groups assigned for display (246), namely "autos-light trucks", "financial-banking" and "industrial machinery". The first term in the sub-group (e.g. "industrial") is the industry group to which the sub-group (e.g. "machinery") belongs. The sub-group information is derived from the input files, such as the FUND.PRI file. In the example of FIG. 8, the three sub-groups assigned for display will be those categories of stocks about which information will be displayed in the virtual reality world. In particular, these sub-groups may be listed along one axis of the virtual reality world. The user can delete an assigned sub-group using a delete button 247.

The sub-group interface card 240 also indicates that there are other "Available" sub-groups (242) which the user can select for display. The user can select an available sub-group (242) for display using a select button 244. When the user has finished selecting and deleting sub-groups for display, the user can activate an "ok" button 249, which will cause control to return to window generated by the user interface module 2.

Figure 9:
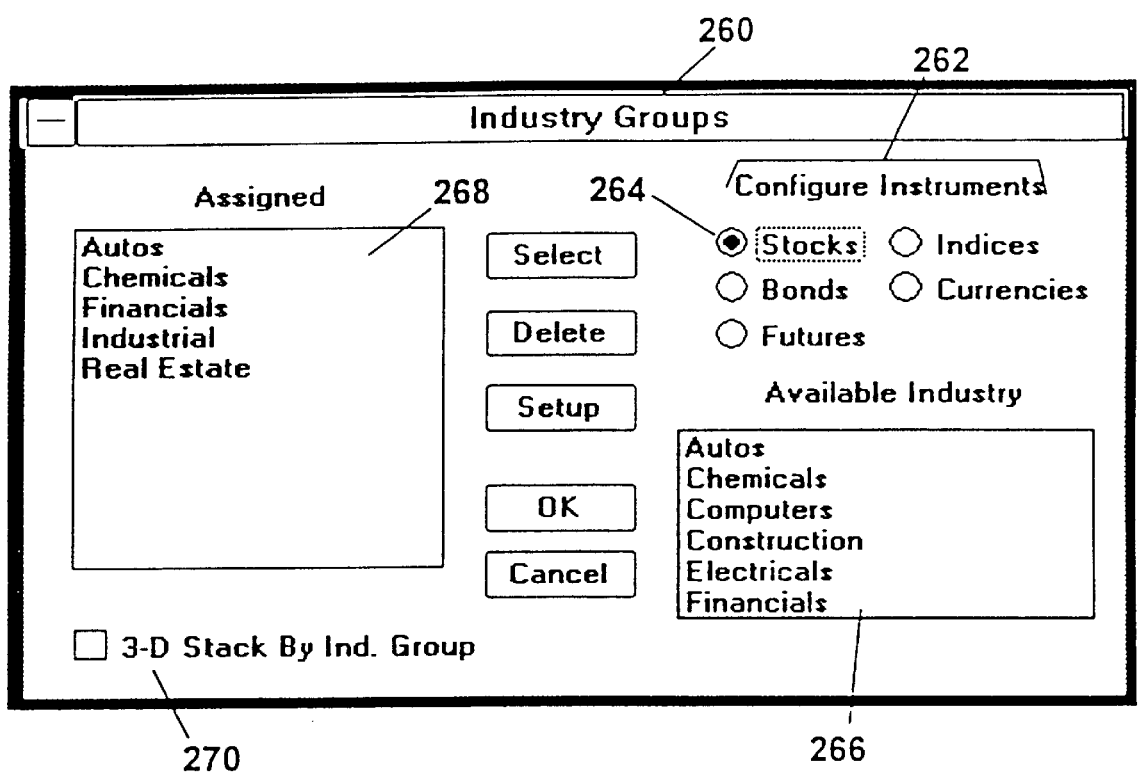
FIG. 9 is an example of a industry group user interface card generated by the user interface module of FIG. 1.

Referring now to FIG. 9, there is illustrated an industry group card 260, which is displayed when the user activates the industry group button 68 on the interface panel of FIG. 2.

This card allows a user to select for display instruments of various industry groups. A user selects an instrument icon from a configure instruments section 262 of the industry group card 260. In the example of FIG. 9, "stocks" 264 have been selected as the instrument. Available industries relating to stocks are displayed in an available industries box 266. A user may select any combination of these industries for display in the virtual reality world. Those industry selected are placed in an assigned box 268. (If another instrument was selected from the configure instruments section 262, the available industries box 266 would comprise "industries" relating to that instrument.)

A three-D stack box 270 allows a user to "stack" industry groups for display in the virtual reality world on a number of discrete levels in the world.

The industry groups card 260, the sub-groups card 240, the super-groups card 210 and the instruments card 200, along with a country's card (not illustrated) allow the user to set what elements may appear on the axes of the virtual reality world.

Referring now to FIG. 10, there is illustrated an action card 300. The action card 300 is displayed when the user activates the action button 50 on the interface card 20 of FIG. 2. The action card 300 allows the user to define formulas for the set of action indicators 26. The user selects an analytic category (fundamental, technical, derivative or expert action) from an analytic type box 302, sets, where applicable, a range from an action screen 304 and defines and builds a formula for that analytic category. A range, for example, could be the top 10 companies by yield.

The user names the action using an action name box 306. Actions that have already been named and defined appear in an available actions box 308. The formula for an action is defined in a formula box 310 using constructs from a formula builders box 312.

When an action has been named and defined, the user is able to select the action using the action indicators 26 and a metaphor box explained below with reference to FIG. 11.

Figure 11:
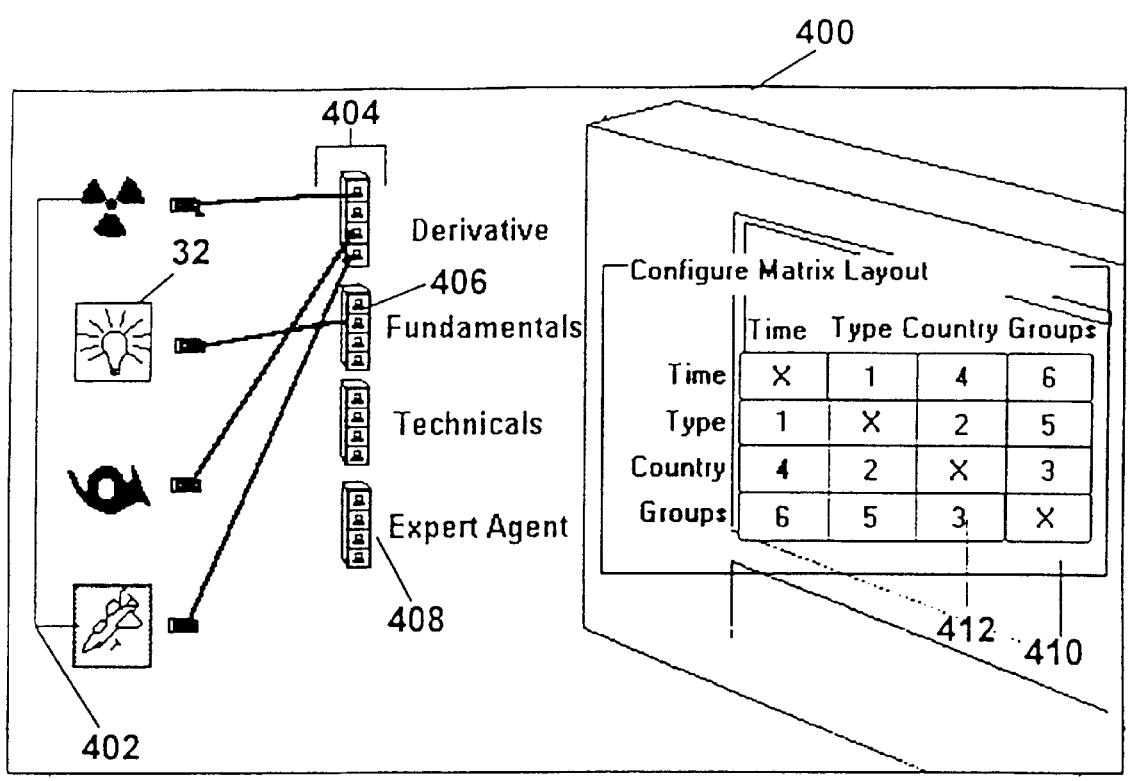
FIG. 11 is an example of a metaphor box generated by the user interface module of FIG. 1.

FIG. 11 illustrates a metaphor box 400, displayed when the user activates the metaphor icon 72 from the interface card 20 of FIG. 2. For each action represented by the action indicators 26, the user must select whether the action relates to a derivative, fundamental, technical or expert agent. To do this, the user "connects" each one of the action icons 402 to the appropriate switch box 404. The interface card then displays the appropriate name (e.g. derivative, fundamental, etc) under the "connected" action indicator 26. (From the interface panel of FIG. 2, the user can then select the action indicator box, which will display all actions for that analytic type, which were defined by the user using the action card 300.) For example, the flashing indicator 32 could be set to the fundamental switch box 406 using the metaphor box 400. All fundamentals defined by the user from the action card 300 will then be displayed for selection if the user activates the appropriate icon 32a on the flashing indicator 32. The selected fundamental is displayed in a combo box 32b of the flashing indicator 32.

As another example, the list produced by the expert agent can be displayed using the action indicators 26) via actions relating to the listed stock's metaphors in the virtual reality world.

A configure matrix layout section 410 of the metaphor box 400 allow the user to select one of six possible grid arrangements for the X-axis and Y-axis for the virtual reality world. For example, if the user selects the third arrangement 412, then the virtual reality world will be displayed consisting of countries selected using the countries filter 64 on one axis and industry groups (or sub-groups) selected using the industry groups card 260 on another other axis.

What is claimed is:

1. A virtual reality generator to display pre-processed financial information as a virtual reality world, the virtual reality generator comprising:

an input module receiving the pre-processed financial information from a financial data feed systems the pre-processed financial data feed system generating the pre-processed financial information as a function of predetermined financial analytics on real-time and pre-stored financial data;

a user interface module including a first input selecting a non-integer terrain parameter for each of a first axis of a three dimensional interface and a second axis of the three dimensional interface and a second input for selecting an axis display parameter for a third axis of the three dimensional interface, the user interface module selecting a portion of the pre-processed financial information as a function of the non-integer terrain parameters and the axis display parameter; and a virtual reality generator module coupled to the input module and the user interface module, the virtual reality generator generating, continuously modifying, and displaying on a display device a virtual reality world being the three dimensional interface that enables a user to simulate movement through and interact with the pre-processed financial information, the virtual reality world representing selected portion of the pre-processed financial information, wherein when the user simulates movement through and interacts with the pre-processed financial information, a user viewing the display device has a sensation of traveling through and within the virtual reality world.

2. The virtual reality generator of claim 1, wherein the selected portion of pre-processed financial information is displayed as a plurality of metaphors in the virtual reality world.

3. The virtual reality generator of claim 2, wherein the user interface module further includes a third input for selecting at least one display parameter, and wherein at least a subset of the plurality of metaphors is displayed as a function of a predetermined one of the at least one display parameter.

4. The virtual reality generator of claim 3, wherein the axis display parameter and the at least one display parameter represent attributes of financial instruments.

5. The virtual reality generator of claim 3, wherein the at least one display parameter displays the subset of the plurality of metaphors via one of a flashing, a spinning, a rotation, a shaping, a coloring and a texturing of the subset of the plurality of metaphors.

6. The virtual reality generator of claim 2 wherein the user interface module includes means for selecting one of the plurality of metaphors and wherein the virtual reality generator module includes means for displaying information relating to the selected one of the plurality of metaphors as a function of the at least one display parameter.

7. The virtual reality generator of claim 6 further comprising means for producing sounds relating to the selected one of the plurality of metaphors.

8. The virtual reality generator of claim 2 wherein the plurality of metaphors include geometric primitives.

9. The virtual reality generator of claim 2 wherein the plurality of metaphors include polygons.

10. The virtual reality generator of claim 2 wherein the plurality of metaphors are rotatable.

11. The virtual reality generator of claim 2 wherein the plurality of metaphors have variable luminance.

12. The virtual reality generator of claim 1 wherein the virtual reality world is divided into a grid of sub-regions.

13. The virtual reality generator of claim 12 wherein the virtual reality world represents the pre-processed financial information for a single industry and each sub-region represents the pre-processed financial information for the single industry in one of a plurality of markets.

14. The virtual reality generator of claim 1 wherein the virtual reality world includes a plurality of metaphors representing a plurality of stocks, each one of the plurality of metaphors being generated as a function of the non-integer terrain parameters and the axis display parameter.

15. The virtual reality generator of claim 14 wherein each one of the plurality of metaphors have shape, size, position, behavior and color to represent financial information concerning one of the plurality of stocks.

16. The virtual reality generator of claim 1 wherein the display device is a visual stereoscopic head-mounted display device.

17. The virtual reality generator of claim 1 wherein the user interface module includes means for displaying a simulated cockpit.

18. The virtual reality generator of claim 1 wherein the virtual reality world is updated at least 30 times per second.

19. The virtual reality generator of claim 1 wherein the virtual reality generator module includes means for generating and simultaneously displaying a plurality of virtual reality worlds.

20. The virtual reality generator of claim 1, wherein the non-integer terrain parameter includes one of an industry group, a country, a market and a type of financial instrument.

21. A virtual reality generator to generate and display on a display device a stream of pre-processed financial information received from a financial analytic system, the virtual reality generator comprising:

an input module to continuously receive the stream of pre-processed financial information from the financial analytic system, the financial analytic system generating the pre-processed financial information as a function of predetermined financial analytics on real-time and pre-stored financial data;

a user interface module having a first input for selecting a non-integer terrain parameter for each of a first axis of a three dimensional interface and a second axis of the three dimensional interface and a second input for selecting an axis display parameter for a third axis of the three dimensional interface, the user interface module selecting a portion of the pre-processed financial information as a function of the non-integer terrain parameters and the axis display parameter; and a virtual reality generator module coupled to the input module and the user interface module, the virtual reality generator generating and displaying a virtual reality world on the display device, the virtual reality world being a three-dimensional representation of the stream of the pre-processed financial information displayable from a plurality of user selected perspectives to enable a user to simulate movement through the virtual reality world such that the user has a sensation of travelling through and within the virtual reality world, the virtual reality generator module including:
  (i) means for generating and continuously modifying the virtual reality world so that the virtual reality world correspondingly represents the stream of the selected portion of the pre-processed financial information,
  (ii) means for causing the virtual reality world to be displayed on the display device, and
  (iii) means for simulating, on the display device, movement through the virtual reality world such that the user viewing the display device has a sensation of travelling through and within the virtual reality world.

22. The virtual reality generator of claim 21 wherein a view of the virtual reality world is generated by the virtual reality generator module at least 30 times per second, and wherein the virtual reality generator module further comprises means for updating the virtual reality world displayed on the display device at least 30 times per second.

23. A virtual reality generator to display on a display device pre-processed financial information, the virtual reality generator comprising:
  an input module to receive the pre-processed financial information as input, the pre-processed financial information including real-time data and pre-stored data;
  a user interface module having a first input for selecting a non-integer terrain parameter for each of a first axis of a three dimensional interface and a second axis of the three dimensional interface and a second input for selecting an axis display parameter for a third axis of the three dimensional interface, the user interface module the selected portion of the pre-processed financial information as a function of the non-integer terrain parameters and the axis display parameter; and
  a virtual reality generator module coupled to the input module and the user interface module, the virtual reality generator generating and displaying a virtual reality world on the display device, the virtual reality world being a three-dimensional representation of the selected portion of the pre-processed financial information continuously displayed from a plurality of user selected perspectives to enable a user to simulate movement through the virtual reality world such that the user has a sensation of travelling through and within the virtual reality world, the virtual reality generator module including
  (i) means for generating the virtual reality world representing the selected portion of the pre-processed financial information,
  (ii) means for causing the virtual reality world to be displayed on the display device from a plurality of perspectives, and
  (iii) means for simulating, on the display device, movement through the virtual reality world such that the user viewing the display device has a sensation of travelling through and within the virtual reality world.

24. The virtual reality generator of claim 23 wherein a view of the virtual reality world is generated by the virtual reality generator module at least 30 times per second, and wherein the virtual reality generator module further comprises means for updating the virtual reality world displayed on the display device at least 30 times per second.

25. The virtual reality generator of claim 23, wherein the real-time data is provided via a real-time data feed.

26. The virtual reality generator of claim 23 wherein the input module receives the financial information from a database of financial information.

27. The virtual reality generator of claim 23 wherein the input module receives the financial information from a real-time data feed and a database.

28. The virtual reality generator of claim 23 wherein the financial information is pre-processed by an analytic system prior to receipt by the input module.

29. The virtual reality generator of claim 23 wherein the financial information is pre-processed by a knowledge-base system prior to receipt by the input module.

30. The virtual reality generator of claim 23 wherein the financial information is pre-processed by a neural network prior receipt by the input module.

31. The virtual reality generator of claim 23 wherein the simulated movement is controlled by movement of a headset containing the display device.

32. The virtual reality generator of claim 23, wherein the user interface module further includes a third input for selecting at least one display parameter, and wherein the virtual reality world includes a plurality of metaphors, each one of the plurality of metaphors representing a subset of the selected portion of the pre-processed financial information.

33. The virtual reality generator of claim 23 wherein the display device is a monitor.

34. The virtual reality generator of claim 23 wherein the display device is a visual stereoscopic head-mounted display device.

35. A virtual reality generator to display on a display device pre-processed financial information as a virtual reality world, the virtual reality world being an interface that enables a user to simulate movement through the pre-processed financial information, the virtual reality generator comprising:
  means for receiving as input in real-time the pre-processed financial information from a data source of pre-processed financial information, the data source providing real-time and pre-stored data;
  a user interface module having a first input for selecting a non-integer terrain parameter for each of a first axis of a three dimensional interface and a second axis of the three dimensional interface and a second input for selecting an axis display parameter for a third axis of the three dimensional interface, the user interface module selecting a portion of the pre-processed financial information as a function of the non-integer terrain parameters and the axis display parameter; and
  a virtual reality generator module coupled to the input module and the user interface module, the virtual reality generator generating and displaying a virtual reality world on the display device, the virtual reality world being a three-dimensional representation of the pre-processed financial information displayable from a plurality of user selected perspectives to enable a user to simulate movement through the virtual reality world such that the user has a sensation of travelling through and within the virtual reality world, the virtual reality generator module including means for:
    (i) generating, in real-time as the selected portion of the pre-processed financial information is received from the real-time data source of financial information, the virtual reality world representing the pre-processed financial information, (ii) displaying in real-time on the display device the virtual reality world representing the selected portion of the pre-processed financial information, (iii) displaying the virtual reality world from a plurality of perspectives, and (iv) simulating in real-time, on the display device, movement through the virtual reality world.

36. The virtual reality generator of claim 35, wherein the selected portion of the pre-processed financial information is displayed as a plurality of metaphors in the virtual reality world.

37. The virtual reality generator of claim 36 wherein the virtual reality generator module includes means for selecting one of the plurality of metaphors and wherein the virtual reality generator module includes means for displaying information relating to the selected one of the plurality of metaphors.

38. The virtual reality generator of claim 35 wherein the virtual reality world is updated at least 30 times per second.

39. The virtual reality generator of claim 35 wherein the virtual reality generator module includes means for generating and simultaneously displaying a plurality of virtual reality worlds.

40. A virtual reality generator, comprising:

an input module to receive packets of pre-processed financial information at regular predetermined intervals, the pre-processed financial information being generated as a function of real-time and pre-stored financial data;

a user interface module having a first input for selecting a non-integer terrain parameter for each of a first axis of a three dimensional interface and a second axis of the three dimensional interface and a second input for selecting an axis display parameter for a third axis of the three dimensional interface, the user interface module selecting a portion of the pre-processed financial information as a function of the non-integer terrain parameters and the axis display parameter;

display means coupled to the input module and the user interface module, the display means for displaying on a display device a virtual reality world generated from the packets of the selected portion of the pre-processed financial information, the virtual reality world being a three-dimensional representation of the packets of the selected portion of the pre-processed financial information continuously displayed from a plurality of user selected perspectives to enable a user to simulate movement through and interact with the virtual reality world such that the user, when viewing the display device, has a sensation of travelling within the virtual reality world; and processing means for updating the virtual reality world when a new packet of pre-processed financial information is received by the input module.

41. A computer-based method for displaying and manipulating large quantities of pre-processed financial information, the method comprising the steps of:

receiving as input the pre-processed financial information, the pre-processed financial information being generated as a function of real-time and pre-stored data;

selecting a non-integer terrain parameter for each of a first axis of a three dimensional interface and a second axis of the three dimensional interface and an axis display parameter for a third axis of the three dimensional interface;

selecting a portion of the pre-processed financial information as a function of the non-integer terrain parameters and the axis display parameter for display;

generating a virtual reality world from the selected portion of the pre-processed financial information, the virtual reality world being a three-dimensional representation of the pre-processed financial information capable of being displayed from a plurality of user selected perspectives to enable a user to simulate movement through the virtual reality world; and displaying on a display device the virtual reality world as the three-dimensional interface that enables simulation of movement through and interaction with the pre-processed financial information such that the user, when viewing the display device, has a sensation of travelling through and within the pre-processed financial information displayed as the virtual reality world.

42. A computer implemented method for displaying and manipulating pre-processed financial information, the method comprising the steps of:

continuously receiving as input packets of the pre-processed financial information, the pre-processed financial information including real-time and pre-stored data;

selecting a non-integer terrain parameter for each of a first axis of a three dimensional interface and a second axis of the three dimensional interface and an axis display parameter for a third axis of the three dimensional interface;

selecting a portion of the pre-processed financial information as a function of the non-integer terrain parameters and the axis display parameter for display;

generating, utilizing a computer processor, a virtual reality world from the packets of pre-processed financial information, the virtual reality world representing the selected portion of the pre-processed financial information and capable of being displayed from a plurality of perspectives to enable a user to simulate movement through the virtual reality world;

displaying the virtual reality world as a three-dimensional representation on a display device such that a user can simulate movement through the pre-processed financial information;

updating, utilizing the computer processor, the virtual reality world on the display device when the selected portion of the pre-processed financial information is received; and simulating movement through the virtual reality world on the display device such that the user, when viewing the display device, has a sensation of travelling through and within the virtual reality world.

* * * * *

(12) EX PARTE REEXAMINATION CERTIFICATE (8949th)
United States Patent
Marshall

(10) Number: US 5,774,878 C1
(45) Certificate Issued: Apr. 10, 2012

(54) VIRTUAL REALITY GENERATOR FOR USE WITH FINANCIAL INFORMATION

(75) Inventor: Paul Steven Marshall, New York, NY (US)

(73) Assignee: Maxus Strategic Systems Inc., Mendon, VT (US)

Reexamination Request:
No. 90/011,792, Jul. 11, 2011

Reexamination Certificate for:
Patent No.: 5,774,878
Issued: Jun. 30, 1998
Appl. No.: 08/267,108
Filed: Jun. 27, 1994

Related U.S. Application Data

(63) Continuation of application No. 07/954,775, filed on Sep. 30, 1992, now Pat. No. 5,675,746.

(51) Int. Cl.
*G06F 17/00* (2006.01)
*G06F 17/50* (2006.01)

(52) U.S. Cl. .................................................. 705/36 R
(58) Field of Classification Search .................... None
See application file for complete search history.

(56) References Cited

To view the complete listing of prior art documents cited during the proceeding for Reexamination Control Number 90/011,792, please refer to the USPTO's public Patent Application Information Retrieval (PAIR) system under the Display References tab.

*Primary Examiner* — M. Sager

(57) ABSTRACT

A virtual reality generator having an input module that receives as input financial information is disclosed. The virtual reality generator outputs to a display device a virtual reality world generated from the financial information. The financial information can be preprocessed by a financial analytic system prior to input to the virtual reality generator. The financial information can be received from a data file. The virtual reality generator can dynamically display and continuously update the virtual reality world. Further, movement through the virtual reality world can be simulated.

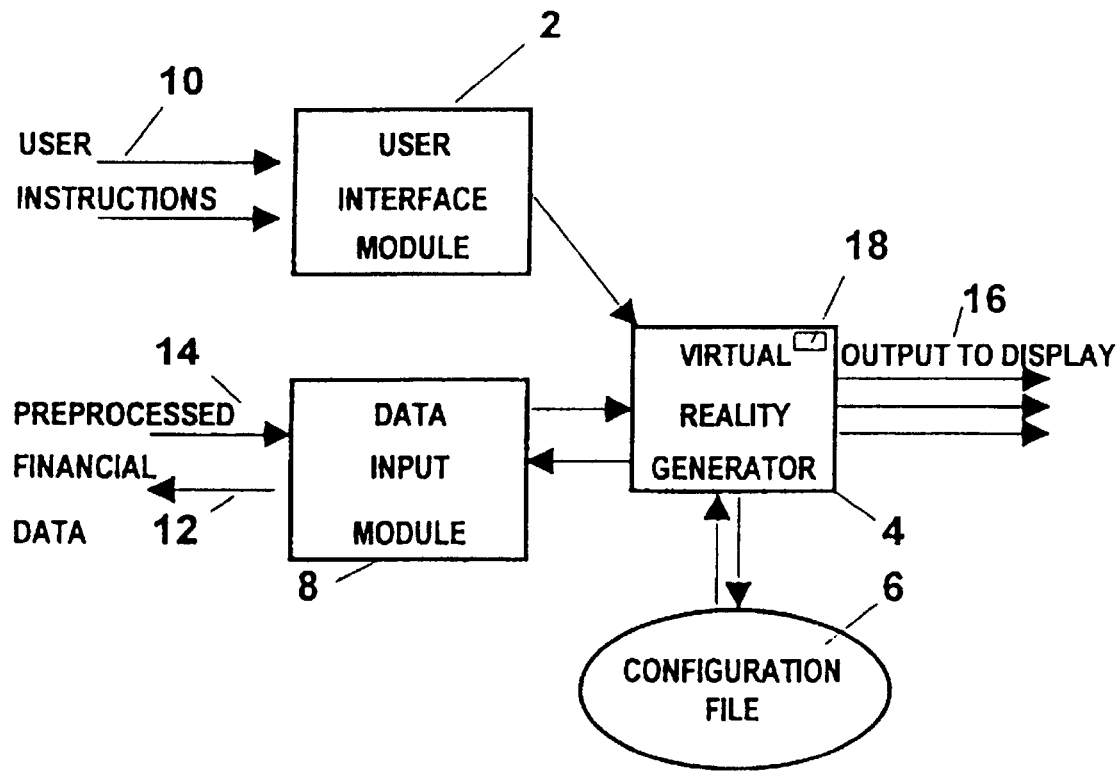

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-42 is confirmed.

* * * * *